(12) United States Patent
Anschuetz et al.

(10) Patent No.: US 10,094,321 B1
(45) Date of Patent: Oct. 9, 2018

(54) METHOD FOR CONTROLLING A MARINE INTERNAL COMBUSTION ENGINE

(71) Applicant: Brunswick Corporation, Lake Forest, IL (US)

(72) Inventors: Steven M. Anschuetz, Fond du Lac, MI (US); Andrew J. Przybyl, Berlin, WI (US); William P. O'Brien, Eden, WI (US); Matthew W. Snyder, Fond du Lac, WI (US); Robert R. Osthelder, Omro, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/597,752

(22) Filed: May 17, 2017

(51) Int. Cl.
| | | |
|---|---|---|
| *F02D 41/34* | (2006.01) | |
| *F02D 41/24* | (2006.01) | |
| *F02D 37/02* | (2006.01) | |
| *F02D 41/22* | (2006.01) | |
| *F02P 5/15* | (2006.01) | |
| *F02D 41/04* | (2006.01) | |

(52) U.S. Cl.
CPC .......... *F02D 41/345* (2013.01); *F02D 37/02* (2013.01); *F02D 41/04* (2013.01); *F02D 41/22* (2013.01); *F02D 41/2422* (2013.01); *F02P 5/1502* (2013.01); *F02D 2200/604* (2013.01)

(58) Field of Classification Search
CPC ........ F02D 41/345; F02D 41/04; F02D 37/02; F02D 41/2422; F02D 41/22; F02D 2200/604; F02P 5/1502
See application file for complete search history.

(56) References Cited

U.S. PATENT DOCUMENTS

| | | |
|---|---|---|
| 5,713,339 A | 2/1998 | Kishida et al. |
| 5,848,582 A | 12/1998 | Ehlers et al. |
| 5,924,404 A | 7/1999 | Ruman et al. |
| 5,988,139 A | 11/1999 | Wasilewski et al. |

(Continued)

OTHER PUBLICATIONS

Snyder, Matthew W., "Methods and Systems for Encoder Synchronization Using Spark and Fuel Modification", Unpublished U.S. Appl. No. 14/695,660, filed Apr. 24, 2015.

(Continued)

*Primary Examiner* — Hung Q Nguyen
*Assistant Examiner* — Xiao Mo
(74) *Attorney, Agent, or Firm* — Andrus Intellectual Property Law, LLP

(57) ABSTRACT

Controlling a marine engine includes operating the engine according to an initial set of mapped parameter values to achieve a first target fuel-air equivalence ratio, determining a first actual fuel-air equivalence ratio, and using a feedback controller to minimize a difference between the first target and actual ratios. Feedback controller outputs are used to populate an initial set of adapt values to adjust combustion parameter values from the initial set of mapped parameter values. The method includes transitioning to operating the engine according to a subsequent set of mapped parameter values to achieve a different target fuel-air equivalence ratio. The method includes determining a second actual fuel-air equivalence ratio, using the feedback controller to minimize a difference between the second target and actual ratios, and using feedback controller outputs to populate a subsequent set of adapt values to adjust combustion parameter values from the subsequent set of mapped parameter values.

20 Claims, 13 Drawing Sheets

(56) References Cited

U.S. PATENT DOCUMENTS

| | | |
|---|---|---|
| 6,250,292 B1 | 6/2001 | Suhre |
| 6,273,771 B1 | 8/2001 | Buckley et al. |
| 6,298,824 B1 | 10/2001 | Suhre |
| 6,311,679 B1 | 11/2001 | Druzhinina et al. |
| 6,726,512 B2 | 4/2004 | Saito |
| 6,757,606 B1 | 6/2004 | Gonring |
| 6,758,185 B2 | 7/2004 | Surnilla et al. |
| 8,725,390 B1 | 5/2014 | Snyder et al. |
| 9,067,662 B2 | 6/2015 | Sako et al. |

OTHER PUBLICATIONS tuneecu.com, "Adaptive Fuel Systems", web article, admitted prior art, last accessed Apr. 13, 2017, available at http://tuneecu.com/Tunes_in_Hex_and_dat/TuneECU/Adaptive_Fuel_Systems_EN_pdf.

Wyatt, Andy, "Closed Loop and Adaptive Tuning", web article and video, Jan. 13, 2014, last accessed Apr. 13, 2017, available at http://www.adaptronic.com.au/closed-loop-and-adaptive-tuning/.

Attainable Adventure Cruising, "Understanding an Engine Fuel Map", Chapter 2 of Online Book "Engines for Cruising Boats", Jun. 2, 2015, last accessed Apr. 7, 2017, available at https://www.morganscloud.com/2015/06/02/understandinganenginefuelmap/.

METHOD FOR CONTROLLING A MARINE INTERNAL COMBUSTION ENGINE

FIELD

The present disclosure relates to internal combustion engines used to power marine propulsion devices on marine vessels.

BACKGROUND

U.S. Pat. No. 5,848,582 discloses a control system for a fuel injector system for an internal combustion engine that is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

U.S. Pat. No. 5,924,404 discloses a direct fuel injected two-stroke engine that controls spark ignition timing and/or ignition coil dwell time on a cylinder-specific basis. The engine also preferably controls fuel injection timing and amount and injection/delivery duration on a cylinder-specific basis. Cylinder-specific customization of spark ignition and fuel injection allows better coordination of spark with fuel injection which results in better running quality, lower emissions, etc. Memory in the electronic control unit for the engine preferably includes a high resolution global look-up table that determines global values for spark ignition and fuel injection control based on engine load (e.g. operator torque demand, throttle position, manifold air pressure, etc.) and engine speed. Memory in the electronic control unit also includes a plurality of low resolution, cylinder-specific offset value look-up tables from which cylinder-specific offset values for spark ignition and fuel injection can be determined, preferably depending on engine load and engine speed. The offset values are combined with the global values to generate cylinder-specific control signals for spark ignition and fuel injection.

U.S. Pat. No. 5,988,139 discloses an engine control system that digitally stores corresponding values of timing angles and engine speeds and selects the timing angles based on the operating speed of the engine. In the engine speed range near idle speed, the timing angle is set to a pre-selected angle after top dead center (ATDC) and the relationship between engine speed and timing angle calls for the timing angle to be advanced from the pre-selected angle after top dead center (ATDC) to successively advancing angles which subsequently increase angles before top dead center (BTDC) as the engine increases in speed. In one application, a timing angle of 10 degrees after top dead center (ATDC) is selected for a engine idle speed of approximately 800 RPM. This relationship, which is controlled by the engine control unit, avoids stalling the engine when an operator suddenly decreases the engine speed.

U.S. Pat. No. 6,250,292 discloses a method which allows a pseudo throttle position sensor value to be calculated as a function of volumetric efficiency, pressure, volume, temperature, and the ideal gas constant in the event that a throttle position sensor fails. This is accomplished by first determining an air per cylinder (APC) value and then calculating the mass air flow into the engine as a function of the air per cylinder (APC) value. The mass air flow is then used, as a ratio of the maximum mass air flow at maximum power at sea level for the engine, to calculate a pseudo throttle position sensor value. That pseudo TPS (BARO) value is then used to select an air/fuel target ratio that allows the control system to calculate the fuel per cycle (FPC) for the engine.

U.S. Pat. No. 6,298,824 discloses a control system for a fuel injected engine including an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control unit to set the operating parameters as a function of engine speed and torque demand, as represented by the position of the throttle handle.

U.S. Pat. No. 6,757,606 discloses a method for controlling the operation of an internal combustion engine that includes the storing of two or more sets of operational relationships which are determined and preselected by calibrating the engine to achieve predetermined characteristics under predetermined operating conditions. The plurality of sets of operational relationships are then stored in a memory device of a microprocessor and later selected in response to a manually entered parameter. The chosen set of operational relationships is selected as a function of the selectable parameter entered by the operator of the marine vessel and the operation of the internal combustion engine is controlled according to that chosen set of operational parameters. This allows two identical internal combustion engines to be operated in different manners to suit the needs of particular applications of the two internal combustion engines.

U.S. Pat. No. 8,725,390 discloses systems and methods for optimizing fuel injection in an internal combustion engine that adjust start of fuel injection by calculating whether one of advancing or retarding start of fuel injection will provide a shortest path from a source angle to a destination angle. Based on the source angle and a given injection pulse width and angle increment, it is determined whether fuel injection will overlap with a specified engine event if start of fuel injection is moved in a direction of the shortest path. A control circuit increments start fuel injection in the direction of the shortest path if it is determined that fuel injection will not overlap with the specified engine event, or increments start fuel injection in a direction opposite that of the shortest path if it is determined that fuel injection will overlap with the specified engine event.

The above-noted patents are hereby incorporated by reference in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for controlling a marine internal combustion engine is carried out by a control module and includes: operating the engine according to an initial set of mapped parameter values that correspond to a combustion parameter, the initial set of mapped parameter values being configured to achieve a first target fuel-air equivalence ratio in a combustion chamber of the engine; determining a first actual fuel-air equivalence ratio in the combustion chamber; and using a feedback controller to minimize a difference between the first target fuel-air equivalence ratio and the first actual fuel-air equivalence ratio. The method includes using outputs of the feedback controller to populate an initial set of adapt values by which to adjust combustion parameter values determined from the initial set of mapped parameter values. Next, the method includes transitioning to operating the engine according to a subsequent set of mapped parameter values that correspond to the combustion parameter, the subsequent set of mapped parameter values being configured to achieve a second, different target fuel-air equivalence ratio in the combustion chamber. After the step of transitioning, the method includes determining a second actual fuel-air equivalence ratio in the combustion chamber, using the feedback controller to minimize a difference between the second target fuel-air equivalence ratio and the second actual fuel-air equivalence ratio, and using the outputs of the feedback controller to populate a subsequent set of adapt values by which to adjust combustion parameter values determined from the subsequent set of mapped parameter values.

According to another example of the present disclosure, a method for controlling a marine internal combustion engine is carried out by a control module and includes: operating the engine according to an initial set of mapped fuel quantity values, the initial set of mapped fuel quantity values being configured to achieve a first target fuel-air equivalence ratio in a combustion chamber of the engine; determining a first actual fuel-air equivalence ratio in the combustion chamber; and using a feedback controller to minimize a difference between the first target fuel-air equivalence ratio and the first actual fuel-air equivalence ratio. The method includes using outputs of the feedback controller to populate an initial set of fuel trim values by which to adjust fuel quantity values determined from the initial set of mapped fuel quantity values. Next, the method includes transitioning to operating the engine according to a subsequent set of mapped fuel quantity values, the subsequent set of mapped fuel quantity values being configured to achieve a second, different target fuel-air equivalence ratio in the combustion chamber. After the step of transitioning, the method includes determining a second actual fuel-air equivalence ratio in the combustion chamber, using the feedback controller to minimize a difference between the second target fuel-air equivalence ratio and the second actual fuel-air equivalence ratio, and using the outputs of the feedback controller to populate a subsequent set of fuel trim values by which to adjust fuel quantity values determined from the subsequent set of mapped fuel quantity values.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
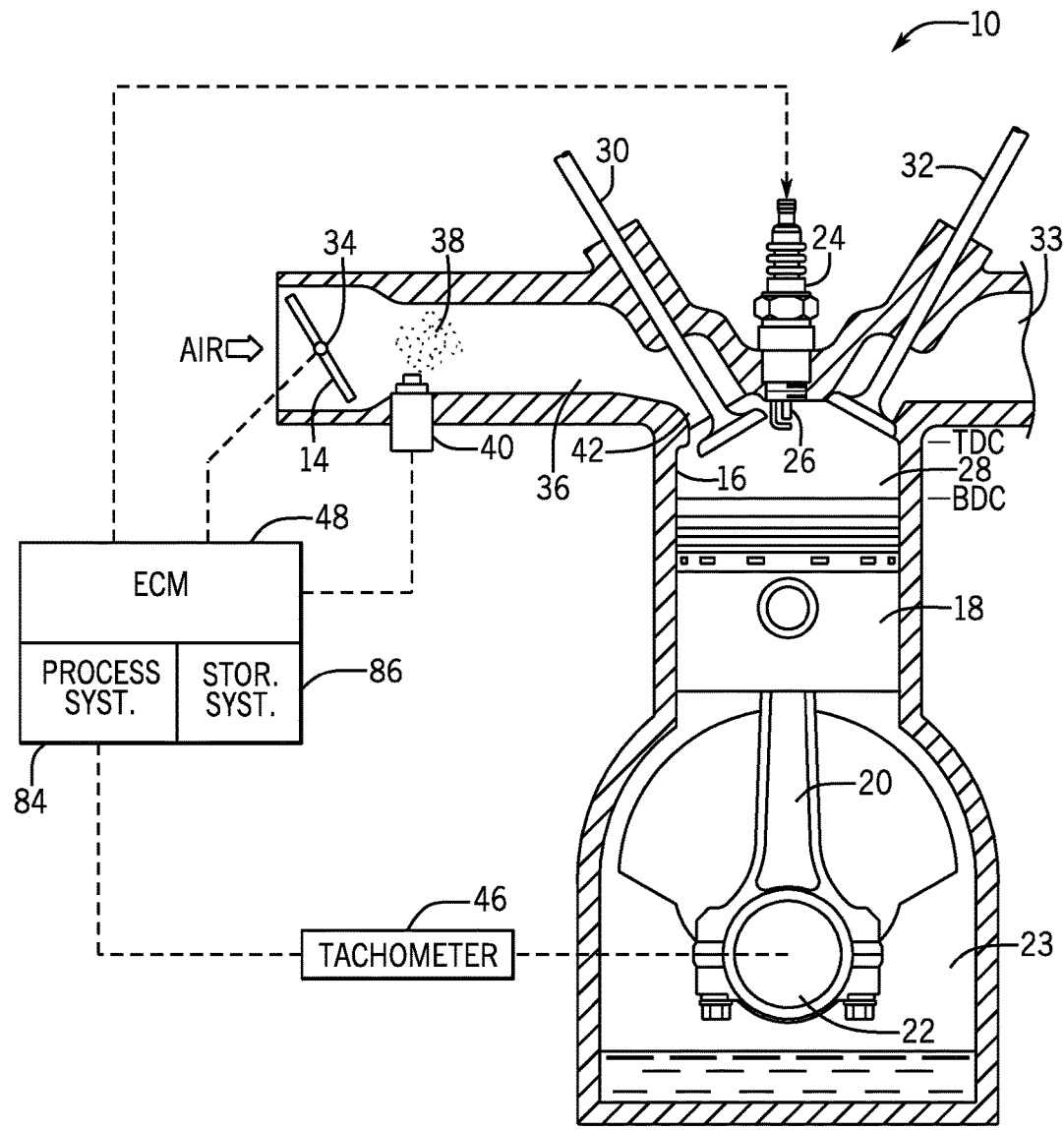
FIG. 1 is a schematic of a marine engine.

FIG. 1 shows an exemplary, but highly simplified, schematic of a four cycle internal combustion engine 10. Although only one cylinder 16 is shown, it should be understood that in most applications of internal combustion engines, a plurality of cylinders 16 are typically used. It should be understood that FIG. 1 is highly simplified for purposes of clarity and to permit the general operation of the internal combustion engine 10 to be described.

Within the cylinder 16, a piston 18 is disposed for reciprocating movement therein. The piston 18 is attached to a connecting rod 20 which, in turn, is attached to a crankshaft 22. The crankshaft 22 rotates about an axis within a crankcase 23, and this rotational movement causes the connecting rod 20 to move the piston 18 back and forth within the cylinder 16 between two limits of travel. The position shown in FIG. 1 represents the piston 18 at its bottom dead center (BDC) position within the cylinder 16. After the crankshaft 22 rotates 180 degrees about its axis, the piston 18 will move to its uppermost position at top dead center (TDC). A sparkplug 24 is configured to provide an igniting spark at its tip 26 to ignite a mixture of fuel and air within the combustion chamber 28.

An intake valve 30 and an exhaust valve 32 are shown, with the intake valve 30 being shown in an opened position and the exhaust valve 32 being shown in a closed position. A throttle valve 14 is shown as being pivotable about center 34 to regulate the flow of air through an air intake conduit 36 of the engine. Fuel 38 is introduced into the air intake conduit 36, in the form of a mist, through fuel injector 40. Although the engine 10 shown herein is an indirect injection engine, the present disclosure also relates to direct injection engines. It should also be understood that the location of the fuel injector 40 could be different from that shown herein, which is only for exemplary purposes. After combustion, byproducts are exhausted from combustion chamber 28 through exhaust valve 32 to exhaust conduit 33.

During operation of the engine shown in FIG. 1, air flows through the air intake conduit 36 under the control of the throttle valve 14. Fuel 38 introduced into the air stream as a mist passes with the air through an intake port 42, which conducts the air/fuel mixture into the combustion chamber 28. The timing of the engine determines the point, relative to the rotation of the crankshaft 22, when the sparkplug 24 is fired to ignite the air/fuel mixture within the combustion chamber 28. If the sparkplug 24 fires before the piston 18 reaches its uppermost position within cylinder 16, it is referred to as being fired before top dead center (BTDC). If the sparkplug 24 is fired when the piston 18 is on its way down from its uppermost position in FIG. 1, it is referred to as being fired after top dead center (ATDC). The crankshaft 22 rotates through 360 degrees of rotation as the piston 18 moves through its entire reciprocating motion. It is typical to refer to the timing of events related to combustion within an engine in terms of the crank angle before top dead center (BTDC) or after top dead center (ATDC), with reference to the position of the piston 18 when the event occurs.

With continued reference to FIG. 1, a tachometer 46 is shown schematically connected in signal communication with the crankshaft 22 or some other device, such as a gear tooth wheel, connected to the crankshaft 22 to allow its rotational speed to be measured. This information from the tachometer 46 is provided to the engine control module (ECM) 48. In a typical application, the engine control module 48 comprises a processor that digitally stores information necessary to allow the ECM 48 to control the timing of the engine 10. A signal is sent from the ECM 48 to an ignition system 76 (FIG. 2) or some other suitable device (e.g., ignition coils, power transistors) to cause the sparkplug 24 to fire.

The throttle valve 14 in FIG. 1 is typically caused to pivot about its center of rotation 34 by electro-mechanical movement of the throttle valve 14 in response to an operator command, as will be described below. In most applications, the throttle valve 14 can be moved from an open position to a closed position where the air passing through the air intake conduit 36 is virtually stopped. However, it should be understood that in most applications of internal combustion engines, means is generally provided to allow a small amount of air to bypass the plate of the throttle valve 14 during idle engine speed conditions in order to allow the engine 10 to continue to operate, although at a significantly reduced speed. This reduced flow of air can be provided by small holes formed through the throttle valve 14 or other bypass channels formed in the structure of the air intake conduit 36. It should be understood that movement of the throttle valve 14 from a closed position to an open position increases the operational speed of the engine and movement of the throttle valve 14 from an open position to a closed position reduces the operational speed of the engine.

Figure 2:
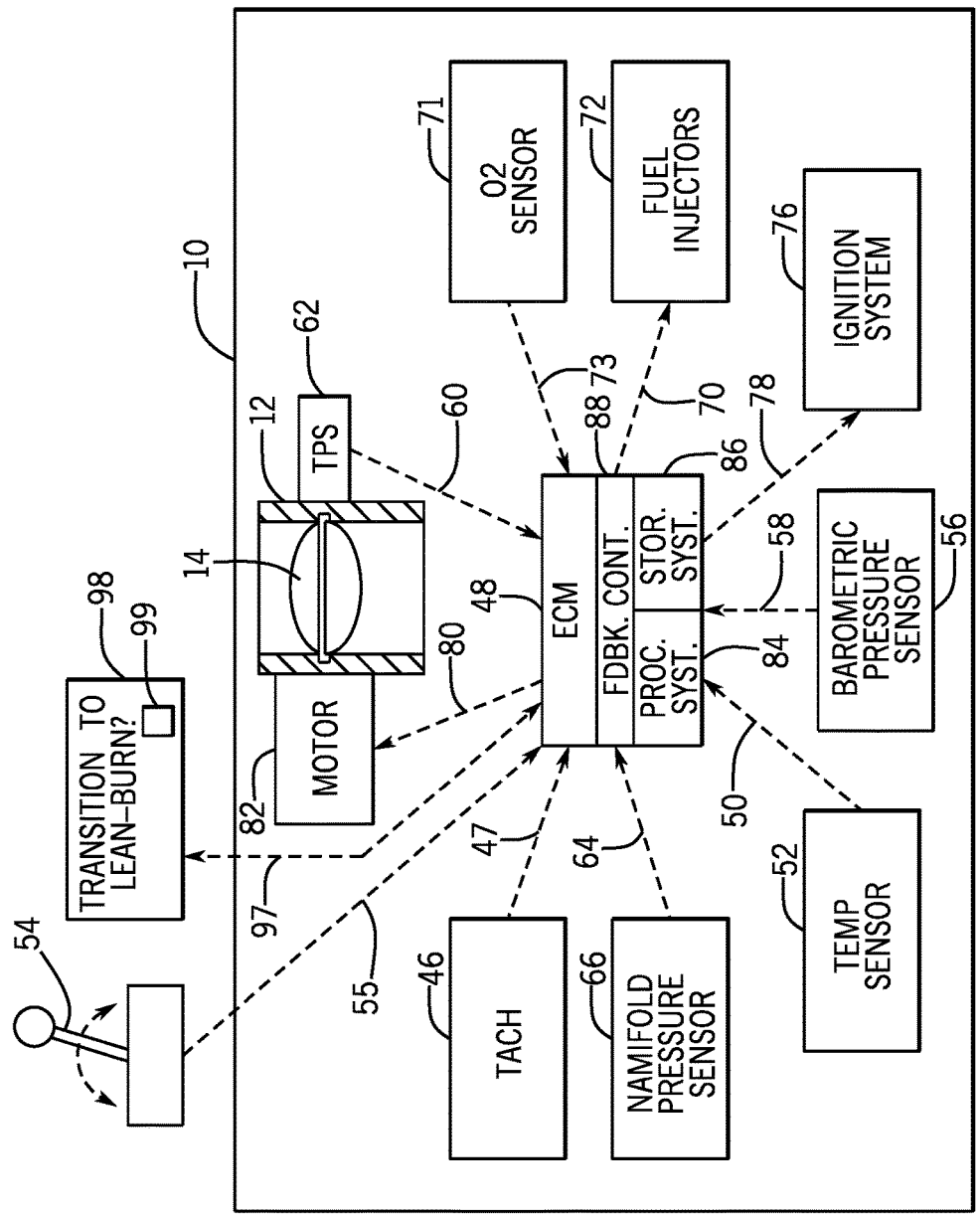
FIG. 2 is a schematic of a marine engine control system.

FIG. 2 is a highly simplified schematic representation of a control system for the engine 10 defining the cylinder 16 of FIG. 1. As noted herein above, as it enters the engine 10, air passes by a throttle valve 14, which is rotatably supported in a throttle body structure 12. The ECM 48 is shown as being connected in signal communication with several sensors in order to enable the ECM 48 to properly select the magnitudes of fuel and air that are provided to each cylinder of the engine 10. For example, the ECM 48 is provided with information that represents the actual angular position of the throttle valve 14. This information is provided on line 60 by a throttle position sensor 62.

With continued reference to FIG. 2, another one of the sensor signals provided to the ECM 48 represents the physical position of a throttle lever 54. The throttle lever 54 is manually moveable, and a signal is provided to the ECM 48 on line 55, which represents the position of the throttle lever 54. The signal on line 55 in turn represents a demand for torque. The ECM 48 is also provided with a signal on line 47 representing engine speed. The signal can be provided by the tachometer 46 or any other instrument that is capable of providing a signal to the ECM 48 representing engine speed. On line 64, the ECM 48 is provided with a signal that is representative of manifold pressure, such as the pressure in air intake conduit 36. Any type of manifold pressure sensor 66 that is capable of providing information to the ECM 48 that is representative of manifold absolute pressure can be used for these purposes. On line 50, the ECM 48 is provided with information representing the temperature at one or more selective locations on the engine 10. Various types of temperature sensors 52 are suitable for these purposes. The ECM 48 is also provided with information regarding atmospheric pressure, from a barometric pressure sensor 56, on line 58. An oxygen sensor 71 provides a reading related to an amount of oxygen, for example in the engine's exhaust, to the ECM 48 on line 73. The oxygen sensor 71 may be a wide-band oxygen sensor.

The ECM 48 provides certain output signals that allows it to control the operation of certain components relating to the engine 10. For example, the ECM 48 provides signals on line 70 to fuel injectors 72 to control the amount of fuel provided to each cylinder per each engine cycle. The ECM 48 also controls the ignition system 76, including the sparkplug 24, by determining the timing and spark energy of each ignition event. The output signals provided by the ECM 48 for these purposes are provided on line 78.

FIG. 2 shows the schematic representation of the various sensors and components that are used by the ECM 48 to control the operation of the engine 10 in direct response to the position of a throttle lever 54. It should be understood that the position of the throttle lever 54 is, in actuality, a request by the operator of a marine vessel for a relative amount of torque to be provided to the propeller shaft of the propulsion system. The position of the throttle lever 54 can be moved by the operator of the marine vessel at any time during the operation of the marine vessel. For example, if the marine vessel is traveling at a generally constant speed, the operator of the marine vessel can move the throttle lever 54 in one direction to increase the speed by providing increased torque to the propeller shaft or, alternatively, the operator of the marine vessel can move the throttle lever 54 in the opposite direction to decrease the amount of torque provided to the propeller shaft and, as a result, decrease the speed of the marine vessel. It should be noted that no direct physical connection need be provided between the throttle lever 54 and the throttle valve 14. Instead, the ECM 48 receives the signals on line 55 that represent the position of the throttle lever 54 and combines that information with other information relating to the operation of the engine 10 to provide appropriate signals on line 80. The signals on line 80 then cause a motor 82 to rotate the throttle valve 14 to a desired position to achieve the torque command received on line 55 from the throttle lever 54.

As will be described further herein below, the ECM 48 may include a feedback controller 88 that uses the readings from the throttle lever 54, tachometer 46, oxygen sensor 71, throttle position sensor 62, and/or other sensors on the engine 10 or vessel to calculate the signals to be sent over line 80 to throttle motor 82, over line 78 to ignition system 76 (including spark plug 24), and over line 70 to fuel injectors 72.

In the example shown, ECM 48 is programmable and includes a processor and a memory. The ECM 48 can be located anywhere in the system and/or located remote from the system and can communicate with various components of the marine vessel via a peripheral interface and wired and/or wireless links, as will be explained further herein below. Although FIGS. 1 and 2 each show only one ECM 48, the system can include more than one control module. Portions of the method disclosed herein below can be carried out by a single control module or by several separate control modules. If more than one control module is provided, each can control operation of a specific device or sub-system on the marine vessel.

In some examples, the ECM 48 may include a processing system 84, storage system 86, software, and input/output (I/O) interfaces for communicating with peripheral devices. The systems may be implemented in hardware and/or software that carries out a programmed set of instructions. For example, the processing system 84 loads and executes software from the storage system, which directs the processing system 84 to operate as described herein below in further detail. The system may include one or more processors, which may be communicatively connected. The processing system 84 can comprise a microprocessor, including a control unit and a processing unit, and other circuitry, such as semiconductor hardware logic, that retrieves and executes software from the storage system. The processing system 84 can be implemented within a single processing device but can also be distributed across multiple processing devices or sub-systems that cooperate according to existing program instructions.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system 86 can comprise any storage media readable by the processing system 84 and capable of storing software. The storage system 86 can include volatile and non-volatile, removable and non-removable media implemented in any method or technology for storage of information, such as computer-readable instructions, data structures, software program modules, or other data. The storage system 86 can be implemented as a single storage device or across multiple storage devices or sub-systems. The storage system 86 can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The ECM 48 communicates with one or more components of the control system via I/O interfaces and a communication link, which can be a wired or wireless link, and is shown schematically by lines 55, 47, 64, 50, 58, 78, 70, 73, 60, and 80. The ECM 48 is capable of monitoring and controlling one or more operational characteristics of the control system and its various subsystems by sending and receiving control signals via the communication link. In one example, the communication link is a controller area network (CAN) bus, but other types of links could be used. It should be noted that the extent of connections of the communication link shown herein is for schematic purposes only, and the communication link in fact provides communication between the ECM 48 and each of the peripheral devices and sensors noted herein, although not every connection is shown in the drawings for purposes of clarity.

Figure 3:
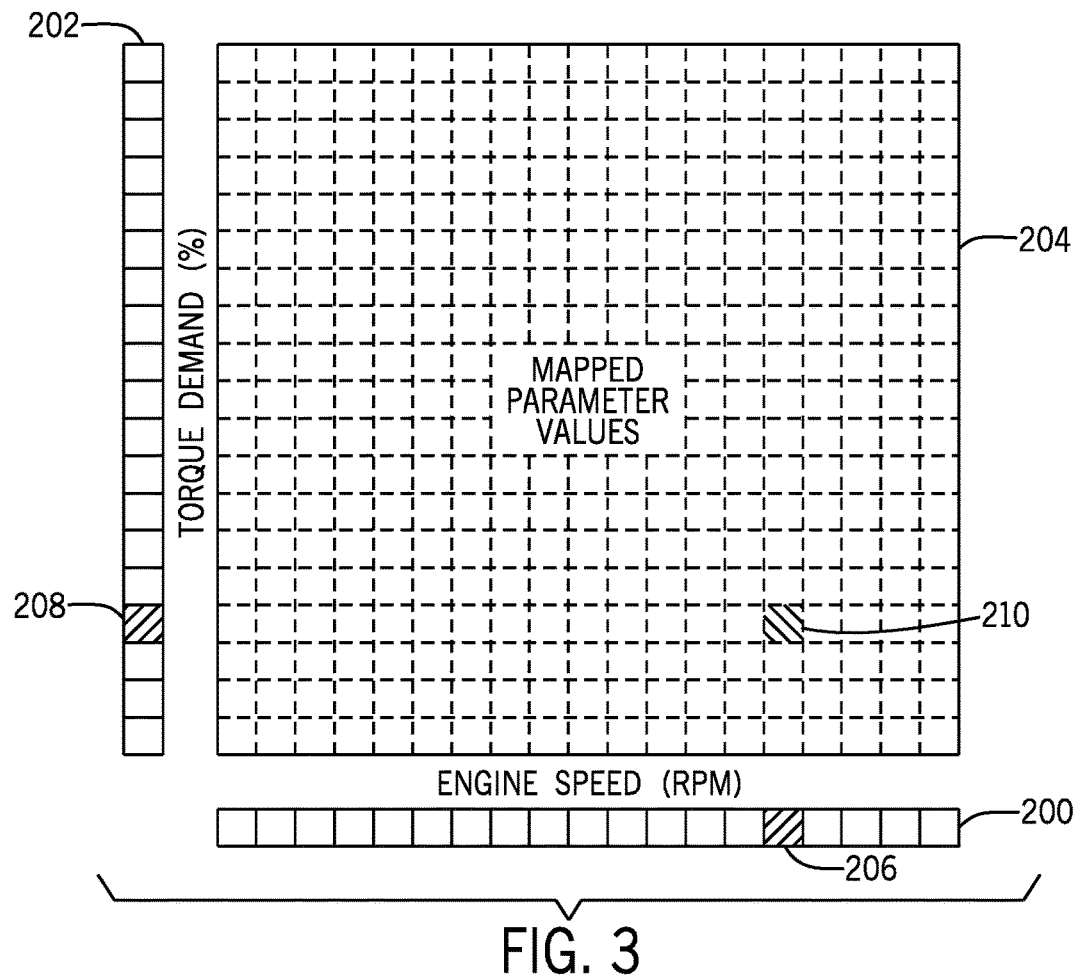
FIG. 3 illustrates a generic example of an input-output map for determining a generic engine control parameter.

In order to convert the input signal on line 55, which relates to the operator's demanded torque, to output signals on each of line 80 to move the throttle motor 82, line 78 to control the ignition system 76, and line 70 to control the fuel injectors 72, the ECM 48 uses a number of input-output maps saved in the storage system 86. FIG. 3 shows the basic structure of an input-output map 204 of a parameter value. The map shown in FIG. 3 does not contain any values and is intended to describe a basic concept used to implement the present methods. The mapped parameter values stored in the storage system 86 of the ECM 48 can be a fuel per cylinder (FPC), a throttle position setpoint (TPS), spark plug activation timing, or any other numeric parameter required by the present algorithms. Most of the mapped parameter values used by the present algorithms are stored as a function of two measured variables, engine speed measured in RPM and torque demand measured as a percentage of maximum torque demand. The actual current engine speed is received by the ECM 48 on line 47 from the tachometer 46 or other sensor that is capable of providing a measured engine speed value. Torque demand is a value that represents the position of the throttle lever 54, stored as a percentage, of its maximum position. Both of the independent variables, engine speed and torque demand, are provided with an ordinate array, 200 and 202 respectively. The ordinate arrays are one dimensional arrays that contain values that allow the processing system 84 to select the appropriate row or column of the map 204 based on the independent variables measured by the sensors and provided to the ECM 48. For example, the ordinate array 200 associated with engine speed will contain magnitudes of RPM that represent the associated columns in the map 204. Similarly, the one dimensional array 202 would contain various percentages that assist the processing system 84 in selecting a row of the map 204. For example, if the engine speed is determined to match the category represented by entry 206 of ordinate array 200 and the torque demand is determined to be represented by the range contained in entry 208 of ordinate array 202, these two values are used to select the column and row, respectively, in the map 204. In the example used in conjunction with FIG. 3, this would result in the selection of the value contained at location 210 of map 204.

Continuing with this example, if the map 204 represented a fuel per cylinder (FPC) value, the value would be selected from location 210 and used for the intended purposes. It should be understood that the arrangement represented in FIG. 3 is used in the present algorithms to select many different variables as a function of engine speed and torque demand. It should also be understood that the specific dimensions of the map 204 are not limiting on the present disclosure. For example, certain map matrices are n by n in dimension while others are m by m in dimension. Similarly, it is not a requirement of the present invention that the matrices be equal in its both dimensions. For example, certain data magnitudes may be more appropriately stored in an n by m matrix, while others are able to be stored in m by m matrices. The size and dimensions of each data map 204 are determined as a function of the required resolution needed to appropriately select the rows and columns of the map. For purposes of the following description, the representative matrices will be provided with a darkened entry, such as that identified by reference numeral 210 in FIG. 3, to represent the fact that only a single numeric variable is used from any particular map during any particular calculation.

The use of catalytic converters using oxidizing catalysts to remove CO and HC, and reducing catalysts to remove CO and $NO_x$, etc., or three-element catalysts, is known as method of cleansing exhaust gas emissions from internal combustion engines. These are mainly used in automobile engines. Because they have different regulatory requirements than automobile engines, non-catalyzed marine engines have the ability to run in lean burn, during which the engine is operated at a fuel/air ratio that is less than stoichiometric (or an air/fuel ratio that is greater than stoichiometric). For a gasoline engine, the stoichiometric air/fuel ratio is 14.7:1. The stoichiometric air/fuel ratio is used to calculate a phi value ($\phi=AFR_{stoich}/AFR$), where $\phi=1$ when the air/fuel mixture is at stoichiometric. In contrast, when running in lean burn, an engine's air/fuel mixture will have a target phi value that is less than 1, and in one non-limiting example is about 0.85. Lean burn operation is therefore at a target air/fuel ratio that is at least 14.8:1, and in one non-limiting example is about 17.3:1. Operating an engine in lean burn can have a significant impact on improving fuel economy. However, the region in which an engine can operate efficiently in lean burn is limited by the coefficient of variation (CoV) of combustion, emissions, torque availability, and drivability. The lean region can be further limited by altitude, engine coolant temperature, fuel system issues, and other engine faults. Nonetheless, through research and development the present inventors have discovered that the potential gain in fuel economy from running in lean burn can be improved by using a binary on/off type of algorithm for initiating and ending lean burn, and by undertaking changes in engine combustion parameters between operating in the stoichiometric region and operating in lean burn separately of one another. This allows the lean burn operating zone of the engine to be pushed to the edges of predetermined run quality, emissions, and efficiency limits.

Although the determinations of the ECM 48 about to be described herein below will be related to the fuel-air equivalence ratio $\phi$ (phi), it should be understood that the relative quantities of fuel and air in the combustion chamber 28 may also or instead be expressed in terms of the air-fuel equivalence ratio $\lambda$ (lambda), the air/fuel ratio (AFR), or the fuel/air ratio (FAR), depending on the programming of the ECM 48. These ratios are related to one another by way of simple mathematics and/or known stoichiometric values, and any of them can be easily determined using the reading from the oxygen sensor 71.

Figure 4A:
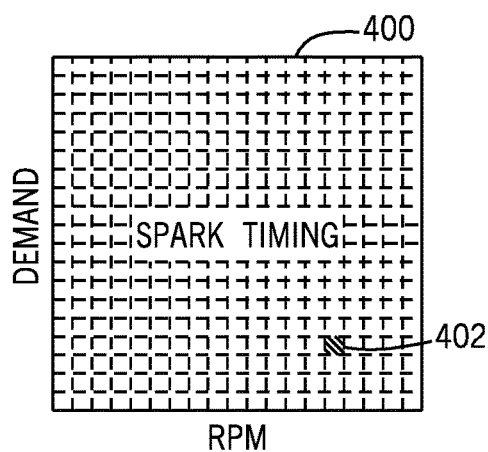
FIGS. 4A and 4B illustrate specific examples of input-output maps for determining timing of ignition of spark plugs of the engine.
Figure 4B:
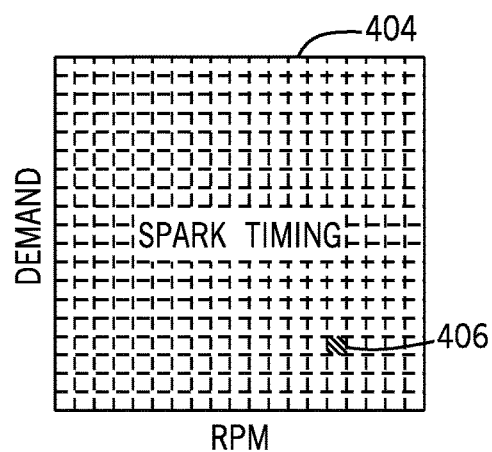
Figure 5A:
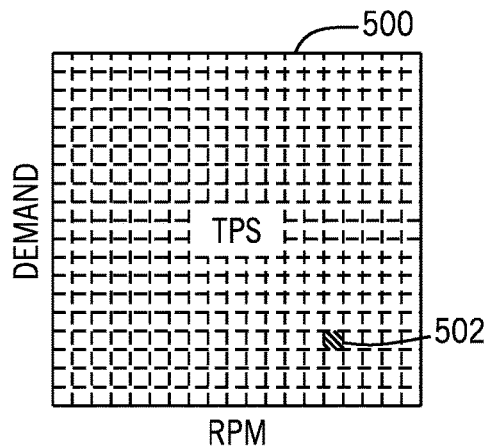
FIGS. 5A and 5B illustrate specific examples of input-output maps for determining air quantity in a combustion chamber of the engine.
Figure 5B:
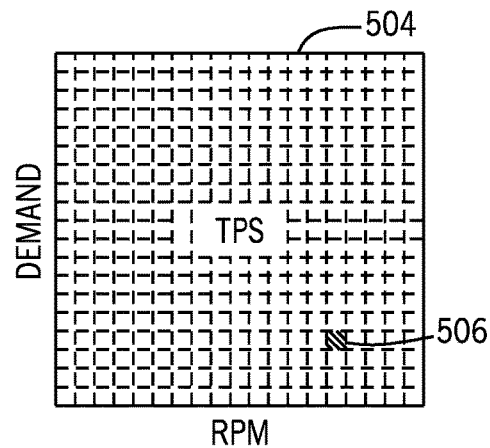
Figure 6A:
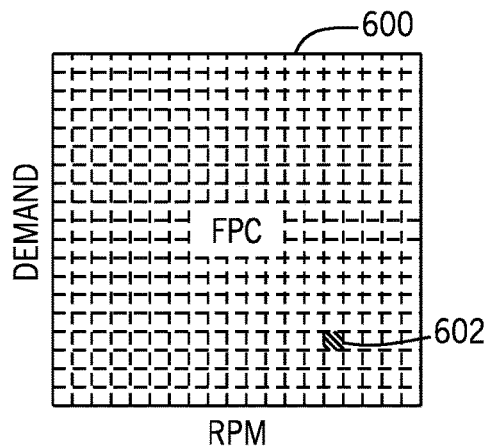
FIGS. 6A and 6B illustrate specific examples of input-output maps for determining fuel quantity in the engine's combustion chamber.
Figure 6B:
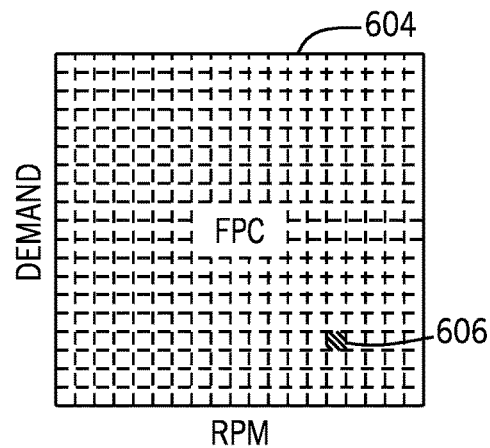

Referring to FIGS. 4A-6B, the present methods use separate sets of combustion parameter maps when the engine 10 is running in the stoichiometric region than when the engine 10 is running in lean burn. Separate stoichiometric and lean-burn combustion parameter maps are saved in the storage system 86 of the ECM 48 for each of three combustion parameters: a timing of activation of the sparkplug 24 associated with the combustion chamber 28, a quantity of fuel to be supplied to the combustion chamber 28 by way of fuel injector 40, and a quantity of air to be supplied to the combustion chamber 28 by way of throttle valve 14. For example, FIG. 4A shows a stoichiometric map for spark plug activation timing, while FIG. 4B shows a lean burn map or an offset map for spark plug activation timing; FIG. 5A shows a stoichiometric map for air quantity, while FIG. 5B shows a lean burn map or an offset map for air quantity; and FIG. 6A shows a stoichiometric map for fuel quantity, while FIG. 6B shows a lean burn map or an offset map for fuel quantity.

Figure 16:
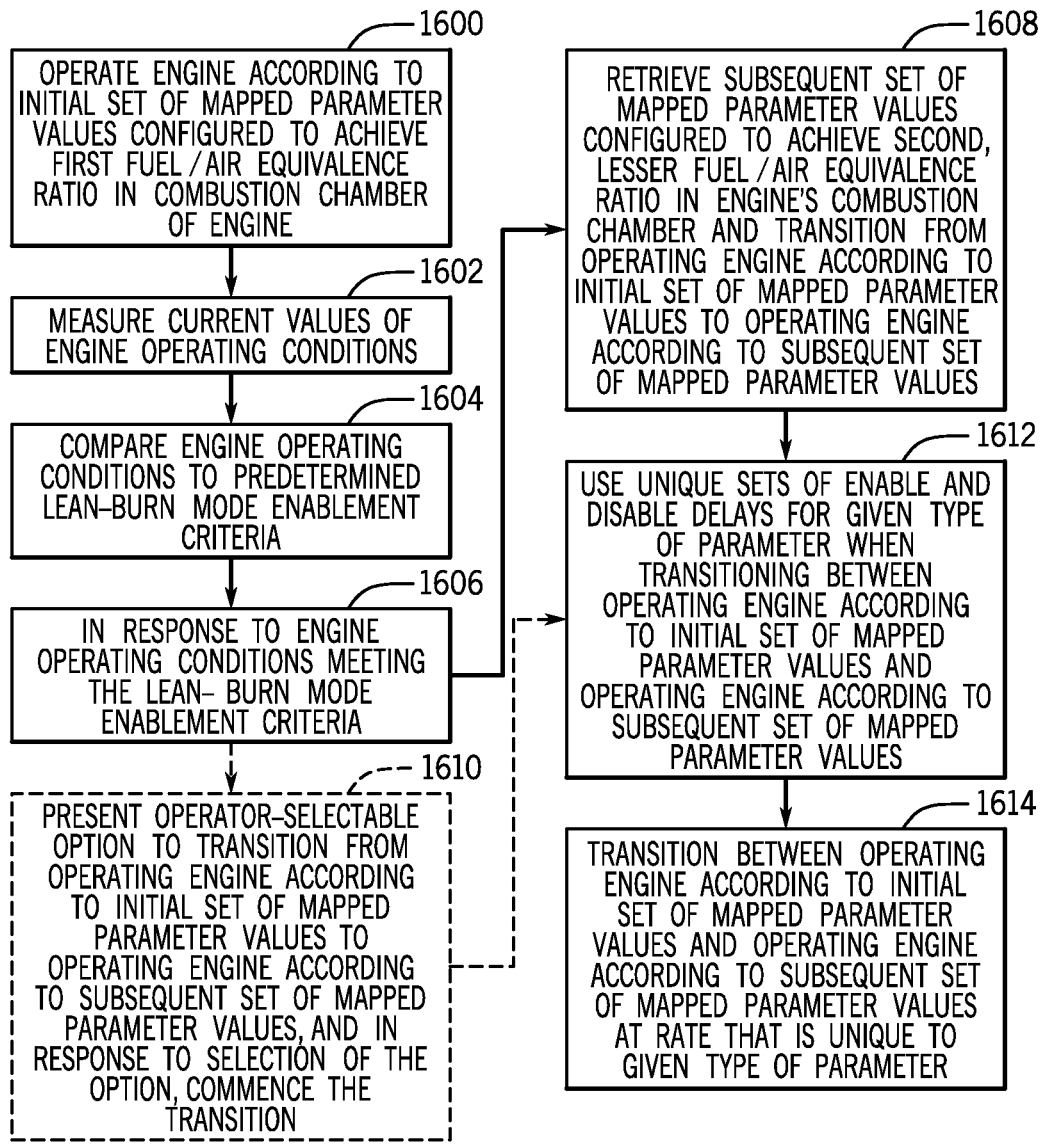
FIGS. 16-21 show various methods according to the present disclosure for transitioning between stoichiometric operation and lean burn operation of the engine.

Turning now to FIG. 16, a method for controlling a marine internal combustion engine 10 will be described. The method is carried out by a control module (e.g., the ECM 48) and, as shown at 1600, includes operating the engine 10 according to an initial set of mapped parameter values configured to achieve a first fuel-air equivalence ratio in a combustion chamber 28 of the engine 10. As shown at 1602, the method includes measuring current values of engine operating conditions. For example, the ECM 48 may obtain information related to a barometric pressure of an atmosphere surrounding the engine 10 from the barometric pressure sensor 56 on line 58. As another example, the ECM 48 may obtain information relating to the temperature of the engine 10 from the temperature sensor 52 on line 50. Other engine operating conditions can also be measured and/or noted. Next, as shown at 1604, the method includes comparing the engine operating conditions to predetermined lean-burn enablement criteria. According to the present disclosure, the lean-burn enablement criteria may include one or more of the following: the engine 10 is running; the barometric pressure of the atmosphere surrounding the engine 10 is greater than a predetermined barometric pressure; the temperature of the engine 10 is greater than a predetermined temperature; and no active engine faults are present that would inhibit lean burn. In one example, the ECM 48 may store a list of predetermined engine faults that, if present, would inhibit lean burn, such as but not limited to: a barometric pressure range fault, a camshaft sensor fault, a crankshaft sensor fault, fuel injector faults, an intake air temperature sensor fault, a MAP sensor fault, an oxygen sensor fault, a coolant temperature sensor fault, or a throttle position sensor fault.

It should be understood that the algorithm may require that all or fewer than all of the lean-burn enablement criteria be met before the method will continue. Additional lean-burn enablement criteria may be used. For example, the lean-burn mode enablement criteria may also include that the engine is operating within an enablement zone as determined by a combination of a speed of the engine 10 and an operator torque demand, as will be described below. As shown at 1606, the method also includes doing one of the following in response to the engine operating conditions meeting the lean-burn mode enablement criteria: (a) automatically retrieving a subsequent set of mapped parameter values configured to achieve a second, lesser fuel-air equivalence ratio in the engine's combustion chamber 28 and automatically transitioning from operating the engine 10 according to the initial set of mapped parameter values to operating the engine 10 according to the subsequent set of mapped parameter values (see 1608); and (b) presenting an operator-selectable option to transition from operating the engine according to the initial set of mapped parameter values to operating the engine according to the subsequent set of mapped parameter values, and in response to selection of the option, commencing the transition (see 1610). Which one of options (a) and (b) the ECM 48 uses could be programmed into the memory upon initial calibration, or could be a selectable function upon start-up of the engine 10. Alternatively, the ECM 48 might present the operator-selectable option for a given period of time after the lean-burn mode enablement criteria have been met, and after the given period of time has elapsed, may automatically transition into lean-burn mode.

In the example in which transitioning to the lean-burn mode is presented as an operator-selectable option (see 1610), a button, keypad, touchscreen, or similar located at the vessel's helm may be used to select such feature. For example, referring to FIG. 2, a screen 98, which is in communication with the ECM 48 via line 97, could display a message to the operator of the vessel asking if the operator would like to transition to lean-burn mode. Such a message could be accompanied by a colored light, flashing of the message, or an audible or haptic alert. Alternatively, no message may be presented, and a button 99 may instead light up or flash. The operator could then push the button 99, which could be a physically depressible key or a digital touch-screen button, in order to commence the transition into lean-burn mode. If the button 99 is not selected, the engine 10 would continue to operate in its current, non-lean-burn mode. Alternatively, a second button could be provided, which allows the operator to select not to enter lean-burn mode despite its availability. Subsequently, in response to the lean-burn mode conditions no longer being present, the screen 98 may similarly present the operator with an option to transition out of lean-burn mode. Alternatively, the ECM 48 may automatically transition out of lean-burn mode.

In one example of the methods according to the present disclosure, the first fuel-air equivalence ratio is greater than or equal to 1 (i.e., the fuel/air ratio is at or above the stoichiometric fuel/air ratio for gasoline), although it should be understood that other fuel/air equivalence ratios could be used. The mapped parameter values in FIGS. 4A, 5A, and 6A would therefore respectively provide spark advance or retard information related to the spark plug timing, throttle position setpoint (TPS) information calibrated to achieve a given air quantity in the combustion chamber 28, and fuel per cylinder (FPC) information calibrated to achieve a given fuel quantity in the combustion chamber 28, which together result in the first fuel-air equivalence ratio. In one example, the second fuel-air equivalence ratio is less than 1 (i.e., the fuel/air ratio is less than stoichiometric), and is at or about $\phi=0.85$, although it should be understood that other fuel/air equivalence ratios could be used. The mapped parameter values in FIGS. 4B, 5B, and 6B would therefore respectively provide spark advance or retard information related to the spark plug timing, throttle position setpoint (TPS) information calibrated to achieve a given air quantity in the combustion chamber 28, and fuel per cylinder (FPC) information calibrated to achieve a given fuel quantity in the combustion chamber 28, which together result in the second fuel-air equivalence ratio. It should be understood that not only can the first and second fuel-air equivalence ratios be other than stoichiometric ($\phi=1$) and lean-burn ($\phi=0.85$), respectively, the first and second fuel-air equivalence ratios could also be reversed, such that the engine 10 transitions from operating at lean burn to operating at stoichiometric. Hereafter, many examples of the present disclosure will be described with respect to transitioning from stoichiometric operation to lean burn operation, but it should be understood that the same principles apply in general when transitioning from a first fuel-air equivalence ratio to a second fuel-air equivalence ratio.

Figure 17:
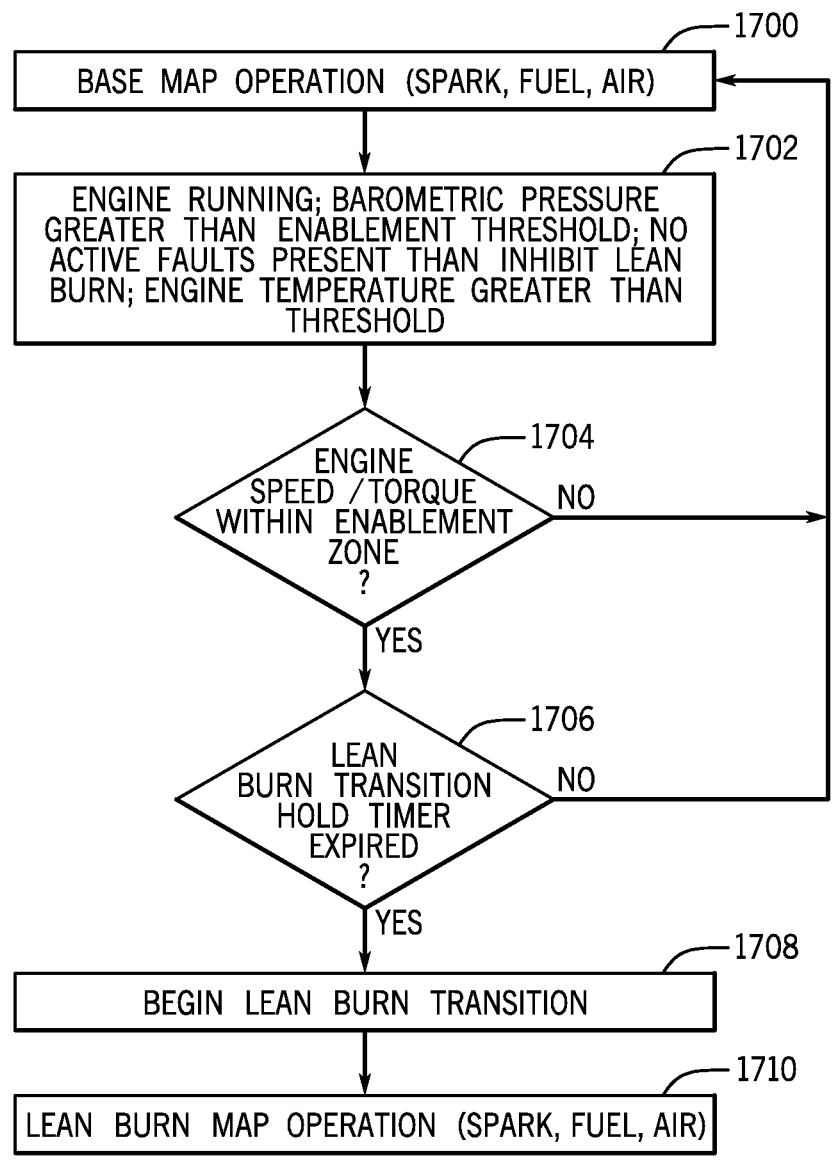

By way of specific example, as shown in FIG. 17, the engine 10 may start by operating according to base (stoichiometric) maps of parameter values for spark, fuel, and air, as shown at 1700. The ECM 48 may then conduct a lean burn initial criteria check, as shown at 1702. As noted above, the ECM 48 may check if the engine 10 is running, the barometric pressure is greater than an enablement threshold, that no predetermined engine fault is present that would inhibit lean burn, and that the engine temperature is greater than an enablement threshold. Being able to disable lean burn under certain conditions, such as at altitude (i.e., low barometric pressure), during cold drive-away, or if certain faults occur, allows a specifically controlled use of the lean burn feature. Once each of the conditions at 1702 is true, the ECM 48 will check if the engine speed and torque are within an enablement zone, as shown at 1704. Engine speed can be determined using the tachometer 46, while engine load can be determined using the readings from the throttle position sensor 62, throttle lever 54, and/or manifold pressure sensor 66. In general, the enablement zone is within the middle range of engine operation, when the engine 10 is operating at or near midrange speeds and at midrange load (such as, for example, 50-70% of maximum rated speed/load, although other delimitations for what is considered "midrange" could used). If this condition is not true, the algorithm returns to 1700. If the engine 10 is operating at midrange speed and midrange load, the ECM 48 next checks if a lean burn transition hold timer has expired, as shown at 1706. Utilizing the timer ensures that the engine 10 is not in a transient state, which would result in lean burn enabling and disabling more frequently than desired. If no, or if any of the other enablement conditions fail during the duration of the timer, the method returns to 1700. If yes, the ECM 48 begins the transition to lean burn, as shown at 1708. Rather than accomplishing such a transition by way of a transition zone in the base spark, fuel, and air maps, the ECM 48 instead transitions to using unique lean burn maps for operation of the engine 10, as shown at 1710.

According to the present disclosure, the initial set of mapped parameter values is contained in a first input-output map that is unique from a second input-output map containing the subsequent set of mapped parameter values, both of which are saved in the storage system 86. That is, the map 400 shown in FIG. 4A is unique from the map 404 shown in FIG. 4B; the map 500 shown in FIG. 5A is unique from the map 504 shown in FIG. 5B; and the map 600 shown in FIG. 6A is unique from the map 604 shown in FIG. 6B. Regardless of whether the ECM 48 makes the lean-burn mode transition automatically (see 1608) or in response to operator selection of the option to transition (see 1610), according to the present example, the ECM 48 uses unique sets of enable and disable delays for a given type of parameter (i.e., spark, fuel, or air) when transitioning between operating the engine 10 according to the initial set of mapped parameter values (found in maps 400, 500, 600) and operating the engine 10 according to the subsequent set of mapped parameter values (found in maps 404, 504, 604). The ECM 48 also transitions between operating the engine 10 according to the initial set of mapped parameter values and operating the engine 10 according to the subsequent set of mapped parameter values at a rate that is unique to the given type of parameter. These steps are shown at 1612 and 1614 of FIG. 16, respectively.

Note that the same lean-burn enablement criteria noted at 1702 and 1704 being untrue will disable lean burn at any time during or after a transition into lean burn. Therefore, the present example also includes transitioning from operating the engine 10 according to the subsequent (lean-burn) set of mapped parameter values to operating the engine 10 according to the initial (stoichiometric) set of mapped parameter values in response to one or more of the engine operating conditions no longer meeting one or more of the respective lean-burn mode enablement criteria. In fact, both during the transition and while operating in lean burn, the ECM 48 will regularly or continuously check the lean-burn enablement criteria. If any of the lean-burn enablement criteria becomes untrue, lean burn transition or operation is terminated, and the ECM 48 returns the system to operating in maps 400, 500, and 600 using disable delays and ramps, as will be described below.

Figure 18:
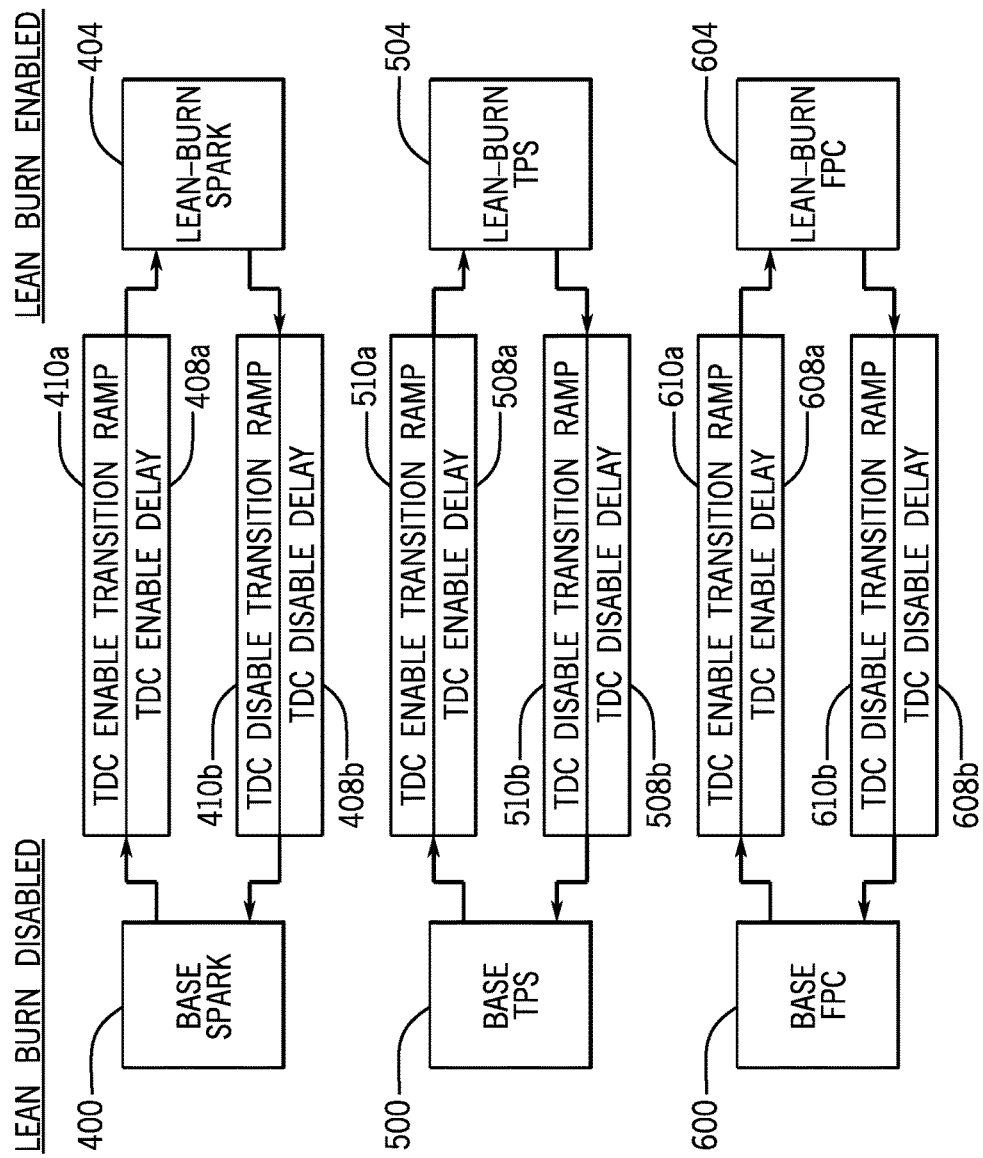

The above-noted concepts are shown generally in FIG. 18, where base spark, air, and fuel maps 400, 500, 600 are shown on the left-hand side as being used when lean-burn is disabled, and lean-burn spark, air, and fuel maps 404, 504, 604 are shown on the right-hand side as being used when lean-burn is enabled. To transition between the two sets of mapped parameter values, the ECM 48 uses unique enable/disable delays. The ECM 48 uses a first set of enable and disable delays 408*a*, 408*b* when transitioning between operating the engine 10 according to spark plug activation timing data in the initial set of mapped parameter values from map 400 and operating the engine 10 according to spark plug activation timing data in the subsequent set of mapped parameter values from map 404. The ECM 48 utilizes a second set of enable and disable delays 508*a*, 508*b* when transitioning between operating the engine 10 according to the air quantity data in the initial set of mapped parameter values from map 500 and operating the engine 10 according to the air quantity data in the subsequent set of mapped parameter values from map 504. The ECM 48 utilizes a third set of enable and disable delays 608*a*, 608*b* when transitioning between operating the engine 10 according to the fuel quantity data in the initial set of mapped parameter values from map 600 and operating the engine 10 according to the fuel quantity data in the subsequent set of mapped parameter values from map 604. These unique delays essentially mean that the spark plug activation timing, fuel quantity, and air quantity can be changed separately from one another during the transition period. This allows for a torque neutral transition, as will be described further herein below, because each of these combustion parameters affects torque output in a different manner, one taking longer than the others, one having a more instantaneous affect than the others, and one having a non-linear effect on torque. Controlling when the base/lean-burn maps transition with respect to one another, as well as the rate at which transitions are made from a base map to a lean-burn map and vice versa, provides a seamless transition into and out of lean burn.

Because the combustion parameters are each scheduled to change during the enable or disable transition period, and because each parameter starts and ends at a unique value, each parameter also has a unique set of enable and disable rates. Continuing with reference to FIG. 18, the ECM 48 transitions at a first rate 410*a* between operating the engine 10 according to spark plug activation timing data in the initial set of mapped parameter values from map 400 and operating the engine according to spark plug activation timing data in the subsequent set of mapped parameter values from map 404. The transition out of lean burn may occur at a rate 410*b*, which may be the same as or different from the first rate 410*a*. The ECM 48 transitions at a second rate 510*a* between operating the engine 10 according to the air quantity data in the initial set of mapped parameter values from map 500 and operating the engine 10 according to the air quantity data in the subsequent set of mapped parameter values from map 504. The transition out of lean burn may occur at a rate 510*b*, which may be the same as or different from the second rate 510*a*. The ECM 48 also transitions at a third rate 610*a* between operating the engine 10 according to the fuel quantity data in the initial set of mapped parameter values from map 600 and operating the engine 10 according to the fuel quantity data in the subsequent set of mapped parameter values 604. The transition out of lean burn may occur at a rate 610*b*, which may be the same as or different from the third rate 610*a*. These unique rates can be expressed as linear lengths of time, as being with respect to TDCs, or as desired slopes/ramps to be used for transitioning from one combustion parameter value to another.

In one example, the subsequent set of mapped parameter values comprises offset values to be added to the initial set of mapped parameter values or by which the initial set of mapped parameters is to be multiplied. That is, the maps 404, 504, 604 may contain offset values or multipliers to be added to or multiplied with a corresponding value from the base maps 400, 500, 600, which offset values or multipliers change the stoichiometric values from the base maps 400, 500, 600 into lean-burn values.

Note that each transition between a base map and a lean burn map (or between the base map and the base-map-plus-offset map) occurs between corresponding values in each map. That is, when transitioning from using base map 400 to lean-burn map 404, the ECM 48 will transition from using a spark timing value found at location 402 to using a spark timing value found at corresponding location 406. Before the transition, other engine speeds and operator demands might command values of spark timing from other cell locations, but once a decision to transition has been made, the current value at location 402 is used as the starting value for the transition. After the transition to the value at location 406 is completed, other engine speeds and operator demands might thereafter command values of spark timing from other cell locations. The same principle holds true for transitions between the maps for the other combustion parameters, where the current values at locations 502 and 602 are used as the starting points for transition, and the target values at locations 506 and 606 are used as the ending points. Thus, the present method includes transitioning from operating the engine 10 according to a current value of a given combustion parameter determined from the initial set of mapped parameter values to operating the engine 10 according to a target value of the given combustion parameter determined from the subsequent set of mapped parameter values.

Figure 8:
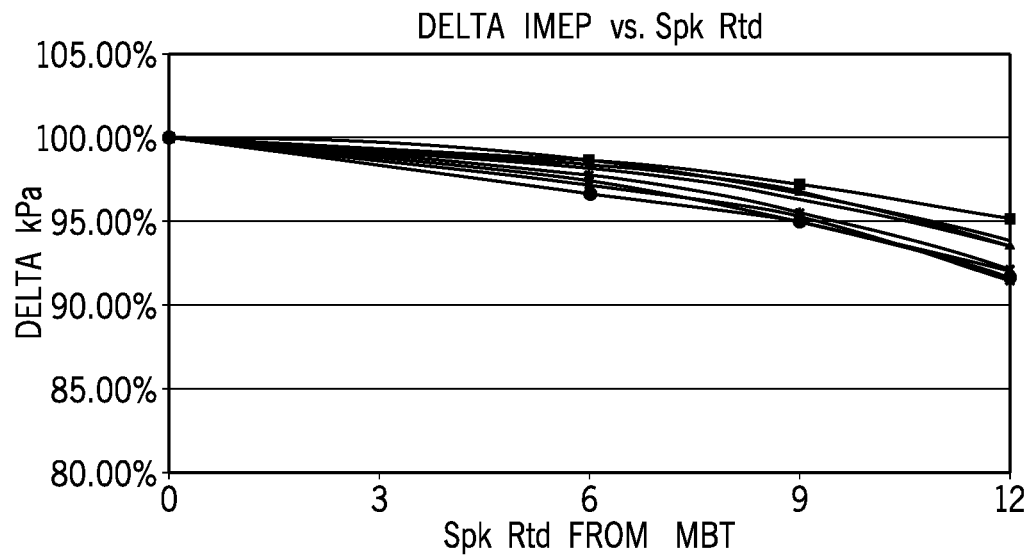
FIG. 8 illustrates a measured relationship between spark plug ignition timing and a change in engine output torque.

During development of an algorithm for transitioning into and out of lean burn, the present inventors found that scheduling the spark, fuel, and air adjustments and how they were cadenced with respect to one another has a significant influence on how the transition into and out of lean burn felt to riders in a marine vessel. For example, the present inventors found that air and spark transitions were relatively linear in terms of their effect on torque. For example, with reference to FIG. 8, the present inventors reviewed actual test data from several different tests of an engine at varying RPM that showed how a change in indicated mean effective pressure (IMEP), such as determined by manifold pressure sensor 66, was relatively linear with respect to spark retard from maximum brake torque (MBT). Air quantity transitions showed a similar linear relationship, but such test data is not shown herein. Specifically, the present inventors noted a linear spark versus torque relationship with no delay and a linear throttle versus torque relationship with a delay to allow for intake manifold filling. In contrast, with reference to FIG. 9, actual test data from tests taken at different engine RPMs showed that changes in the fuel-air equivalence ratio phi due to fueling transitions are relatively linear (see trend at 902) down to a particular phi value (see arrow pointing to location 900), after which the torque gradient becomes quite steep (see trend at 904). Here, the phi value is shown as being at about 1.05; however, it should be noted that the phi value at which the torque gradient steepens is different for different engines and even for the same engine operating at different engine speeds. Thus, the present inventors developed a method for controlling the cadence of spark, air, and fuel transitions that will manage the torque gradients through the transitions into and out of lean burn.

Figure 19:
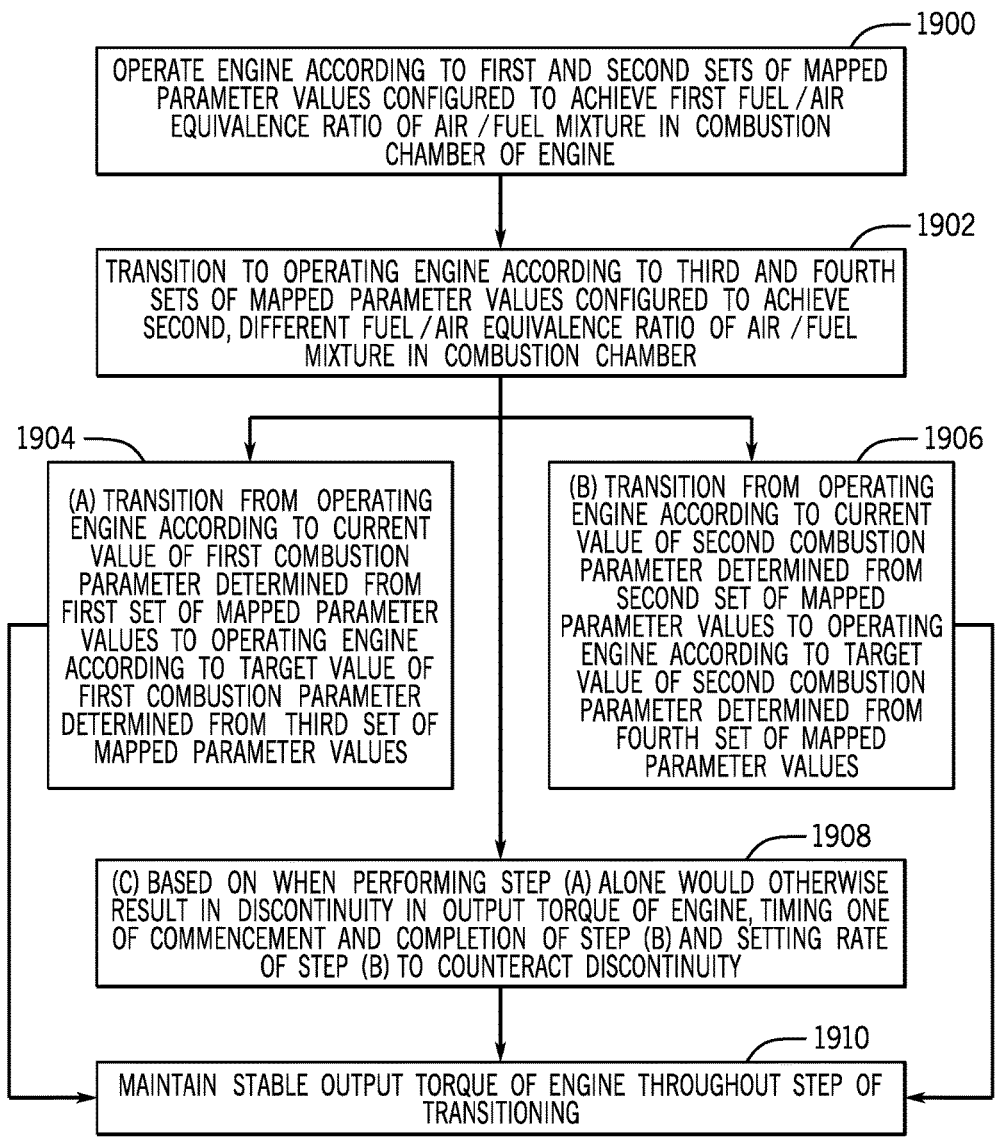

Referring to FIG. 19, a method for controlling such cadencing includes operating the engine 10 according to first and second sets of mapped parameter values configured to achieve a first fuel-air equivalence ratio of an air/fuel mixture in a combustion chamber 28 of the engine 10, as shown at 1900. The method then includes transitioning to operating the engine 10 according to third and fourth sets of mapped parameter values configured to achieve a second, different fuel-air equivalence ratio of the air/fuel mixture in the combustion chamber 28, as shown at 1902. The first and third sets of mapped parameter values correspond to a first combustion parameter (i.e., spark, air, or fuel), and the second and fourth sets of mapped parameter values correspond to a second combustion parameter (i.e., spark, air or fuel). The step of transitioning further includes: (a) transitioning from operating the engine 10 according to a current value of the first combustion parameter determined from the first set of mapped parameter values to operating the engine 10 according to a target value of the first combustion parameter determined from the third set of mapped parameter values, as shown at 1904. The step of transitioning also includes: (b) transitioning from operating the engine 10 according to a current value of the second combustion parameter determined from the second set of mapped parameter values to operating the engine 10 according to a target value of the second combustion parameter determined from the fourth set of mapped parameter values, as shown at 1906. As shown at 1908, the step of transitioning also includes: (c) based on when performing step (a) alone would otherwise result in a discontinuity in the output torque of the engine 10, timing one of commencement and completion of step (b) and setting a rate of step (b) to counteract the discontinuity. Performing steps (a), (b), and (c) allows the ECM 48 to maintain a stable output torque of the engine 10 throughout the step of transitioning, as shown at 1910. According to the information provided above with respect to FIG. 9, the phi change due to fueling transitions has been shown to result in a discontinuity in output torque. Therefore, the first combustion parameter is a quantity of fuel to be supplied to the combustion chamber 28, and the second combustion parameter is one of a timing of activation of the sparkplug 24 associated with the combustion chamber 28 and a quantity of air to be supplied to the combustion chamber 28.

The method may also include operating the engine 10 according to an additional fifth set of mapped parameter values configured to achieve the first fuel-air equivalence ratio in the combustion chamber 28 and transitioning to operating the engine 10 according to an additional sixth set of mapped parameter values configured to achieve the second fuel-air equivalence ratio in the combustion chamber 28. The fifth and sixth sets of mapped parameter values correspond to a third combustion parameter, and the step of transitioning further comprises: (d) transitioning from operating the engine 10 according to a current value of the third combustion parameter determined from the fifth set of mapped parameter values to operating the engine 10 according to a target value of the third combustion parameter determined from the sixth set of mapped parameter values; and (e) based on when performing step (a) alone would otherwise result in the discontinuity in the engine's output torque, timing one of commencement and completion of step (d) and setting a rate of step (d) to counteract the discontinuity. In this instance, because spark timing produces the most instantaneous result, the second combustion parameter is the air quantity, and the third combustion parameter is the spark plug activation timing.

As noted herein above, the methods described herein apply both to transitioning into and out of lean burn, and therefore, the present method includes measuring current values of engine operating conditions and comparing the engine operating conditions to predetermined lean-burn mode enablement criteria. When the first fuel-air equivalence ratio is greater than or equal to 1 and the second fuel-air equivalence ratio is less than 1, the method includes commencing the step of transitioning (step 1902) in response to the engine operating conditions meeting the lean-burn mode enablement criteria. Alternatively, when the first fuel-air equivalence ratio is less than 1 and the second fuel-air equivalence ratio is greater than or equal to 1, the method includes commencing the step of transitioning (step 1902) in response to one or more of the engine operating conditions not meeting the lean-burn mode enablement criteria. These enablement criteria were noted with respect to FIGS. 16 and 17.

Figure 20:
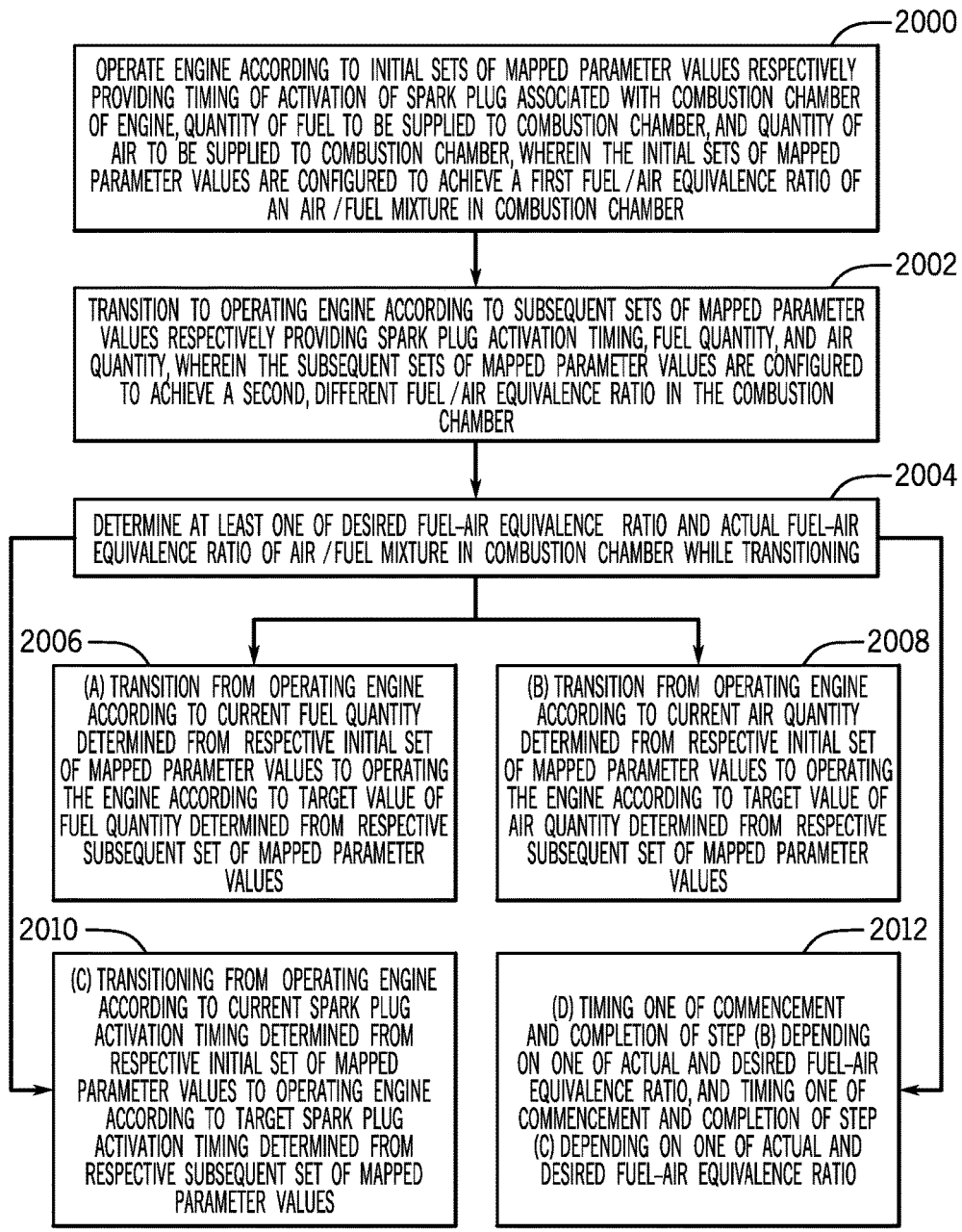

Referring now to FIG. 20, a specific example of the method of the present disclosure will be described. As shown at 2000, the method includes operating the engine 10 according to initial sets of mapped parameter values respectively providing a timing of activation of the sparkplug 24 associated with a combustion chamber 28 of the engine (e.g., map 400, FIG. 4A), a quantity of air to be supplied to the combustion chamber 28 (e.g., map 500, FIG. 5A), and a quantity of fuel to be supplied to the combustion chamber 28 (e.g., map 600, FIG. 6A), wherein the initial sets of mapped parameter values are configured to achieve a first fuel-air equivalence ratio of an air/fuel mixture in the combustion chamber 28. As shown at 2002, the method next includes transitioning to operating the engine 10 according to subsequent sets of mapped parameter values respectively providing the spark plug activation timing (e.g., map 404, FIG. 4B), the air quantity (e.g., map 504, FIG. 5B), and the fuel quantity (e.g., map 604, FIG. 6B), wherein the subsequent sets of mapped parameter values are configured to achieve a second, different fuel-air equivalence ratio of the air/fuel mixture in the combustion chamber 28.

As shown at 2004, the method also includes determining at least one of a desired fuel-air equivalence ratio and an actual fuel-air equivalence ratio of the air/fuel mixture in the combustion chamber 28 while carrying out the step of transitioning (step 2002). The actual fuel-air equivalence ratio can be determined by measuring an amount of oxygen in exhaust exiting the combustion chamber 28 and determining the actual fuel-air equivalence ratio based on the amount of oxygen. For this purpose, the oxygen sensor 71 can be placed downstream of the exhaust valve 32, along the exhaust conduit 33. For example, if the oxygen sensor 71 is a lambda sensor, which measures $\lambda = AFR/AFR_{stoich}$, the ECM 48 can compute the actual fuel-air equivalence ratio as $\phi = 1/\lambda$. The desired fuel-air equivalence ratio at any given point during the transition can be determined by way of interpolation based on the first fuel-air equivalence ratio, the second fuel-air equivalence ratio, and a time since the step of transitioning commenced. The time can be measured in conventional units of time or in relation to combustion events, such as TDCs, and a linear relationship between time and the desired fuel-air equivalence ratio can be assumed for purposes of interpolating the desired value between the first and second fuel-air equivalence ratios.

FIG. 20 also shows that the step of transitioning includes: (a) transitioning from operating the engine 10 according to a current fuel quantity from location 602 determined from a respective initial set of mapped parameter values in map 600 to operating the engine 10 according to a target fuel quantity from location 606 determined from a respective subsequent set of mapped parameter values in map 604, as shown at 2006. As shown at 2008, the step of transitioning also includes: (b) transitioning from operating the engine 10 according to a current air quantity at location 502 determined from a respective initial set of mapped parameter values from map 500 to operating the engine 10 according to a target air quantity from location 506 determined from a respective subsequent set of mapped parameter values from map 504. The transitioning step also includes: (c) transitioning from operating the engine 10 according to a current spark plug activation timing at location 402 determined from a respective initial set of mapped parameter values from map 400 to operating the engine 10 according to a target spark plug activation timing at location 406 determined from a respective subsequent set of mapped parameter values from map 404, as shown at 2010. As shown at 2012, the transitioning step also includes: (d) timing one of commencement and completion of step (b) depending on one of the actual fuel-air equivalence ratio and the desired fuel-air equivalence ratio $\phi$ and timing one of commencement and completion of step (c) depending on one of the actual fuel-air equivalence ratio and the desired fuel-air equivalence ratio $\phi$.

Figure 9:
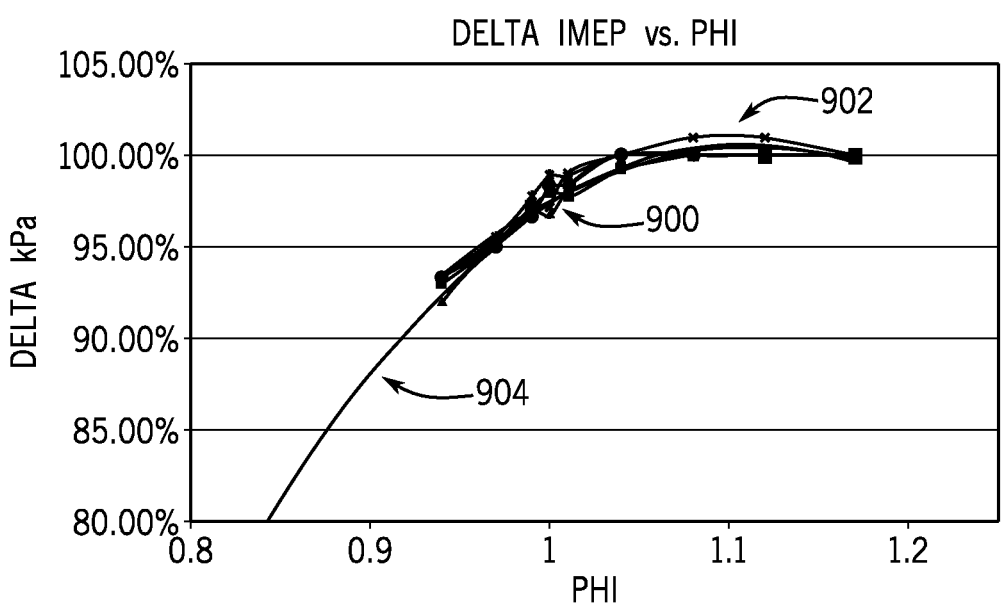
FIG. 9 illustrates a measured relationship between a fuel-air equivalence ratio (phi) and a change in engine output torque.
Figure 10:
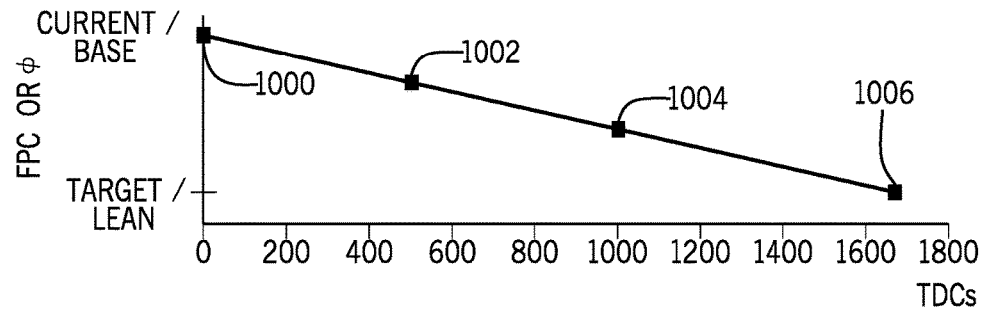
FIG. 10 illustrates a transition from an initial fuel quantity or phi value to a subsequent fuel quantity or phi value when transitioning from operating an engine according to a first, higher fuel-air equivalence ratio to operating the engine according to a second, lower fuel-air equivalence ratio.
Figure 11:
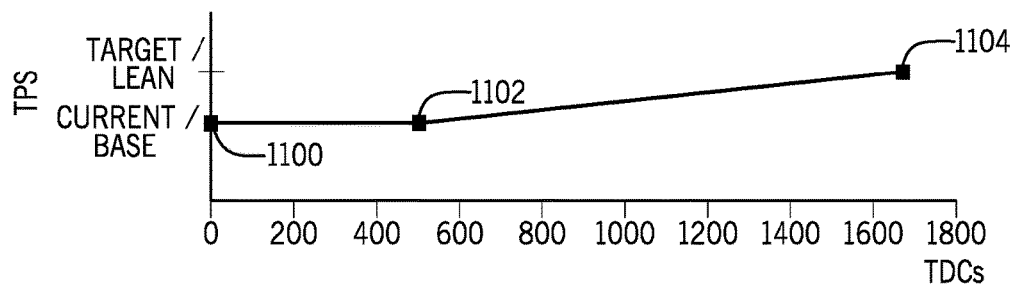
FIG. 11 illustrates a transition from an initial air quantity value to a subsequent air quantity value when transitioning from operating an engine according to the first, higher fuel-air equivalence ratio to operating the engine according to the second, lower fuel-air equivalence ratio.
Figure 12:
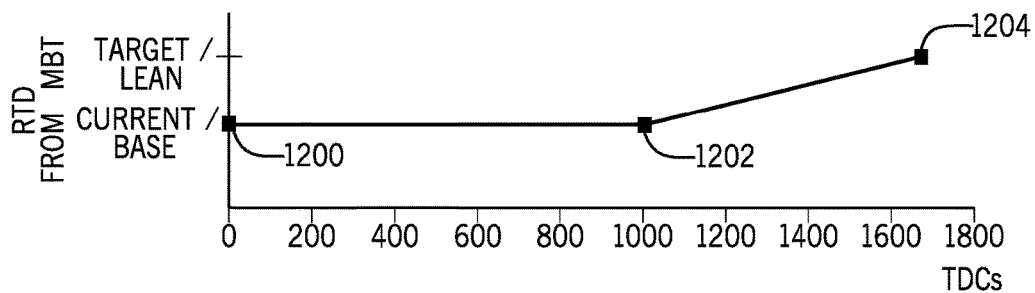
FIG. 12 illustrates a transition from an initial spark plug activation timing value to a subsequent spark plug activation timing value when transitioning from operating an engine according to the first, higher fuel-air equivalence ratio to operating the engine according to the second, lower fuel-air equivalence ratio.

FIGS. 10-12 show graphical depictions of the transition into lean burn, when the first fuel-air equivalence ratio is greater than the second fuel-air equivalence ratio. FIG. 10 shows how upon initiating transition at zero TDCs, the FPC value starts at a current (base) value 1000, which would have been previously determined from map 600, and transitions to a target (lean) value 1006, determined from map 604. Note that the plot shown in FIG. 10 can also represent the transition from a current (first) fuel-air equivalence ratio to a target (second) fuel-air equivalence ratio. The ECM 48 schedules this transition to occur over about 1650 TDCs, although another time period could be used. FIG. 11 shows how the ECM 48 commences step (b), here related to transitioning the air quantity (see step 2008, FIG. 20), in response to the actual fuel-air equivalence ratio $\phi$ reaching a first predetermined value. In another example, the ECM 48 is programmed to commence step (b) in response to the desired fuel-air equivalence ratio, determined via linear interpolation as noted herein above, reaching the first predetermined value. This first predetermined value is reached at location 1002 in FIG. 10, where a particular value of FPC results in an actual $\phi$ value (as determined from the signal from the oxygen sensor 71) or a desired $\phi$ value (as determined via linear interpolation) at which the torque gradient on the phi versus torque plot drastically changes (see FIG. 9, location 900). The beginning of the transitioning of the air quantity value starts at the time the actual or desired phi value reaches the first predetermined value at location 1002, which here is at about 500 TDCs, as shown at location 1102. The air quantity thereafter transitions from a current (base) value 1102 to a target (lean) value at 1104. Note that from 1100 to 1102, the ECM 48 holds the current value of the air quantity (determined from map 500) until the actual or desired fuel-air equivalence ratio $\phi$ reaches the first predetermined value, at location 1002.

Similarly, the method includes commencing step (c), here related to transitioning the spark timing (see step 2010, FIG. 20) in response to the actual or desired fuel-air equivalence ratio reaching a second, lesser predetermined value. This occurs at location 1004 in FIG. 10, where a particular value of FPC results in an actual phi value as determined by the signal from the oxygen sensor 71 or in a desired phi value as determined via linear interpolation reaching the second predetermined value. As shown in FIG. 12, the beginning of the transitioning of the spark valve timing value (for example, a retarded time from MBT) starts at the time the actual or desired phi value reaches the second predetermined value at location 1004, which here is at about 1000 TDCs, as shown at location 1202. The spark plug activation timing thereafter transitions from a current (base) value 1202 to a target (lean) value at 1204. Note that from 1200 to 1202, the ECM 48 holds the current value of the spark plug activation timing (determined from map 400) until the actual or desired fuel-air equivalence ratio $\phi$ reaches the second predetermined value, at location 1004.

Figure 13:
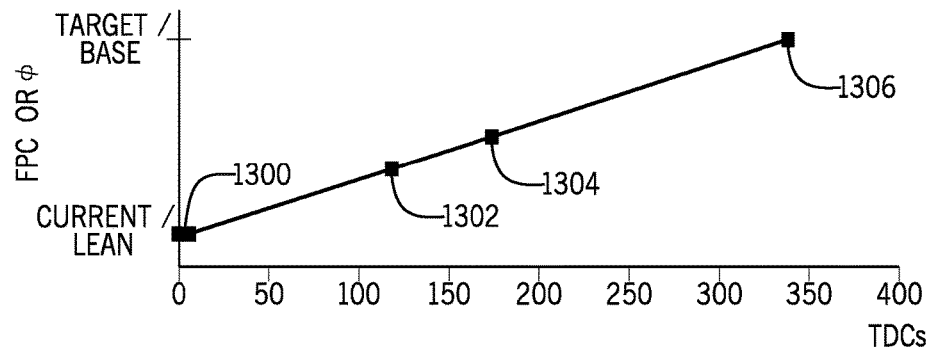
FIG. 13 illustrates a transition from an initial fuel quantity value to a subsequent fuel quantity value when transitioning from operating an engine according to a first, lower fuel-air equivalence ratio to operating the engine according to a second, higher fuel-air equivalence ratio.
Figure 14:
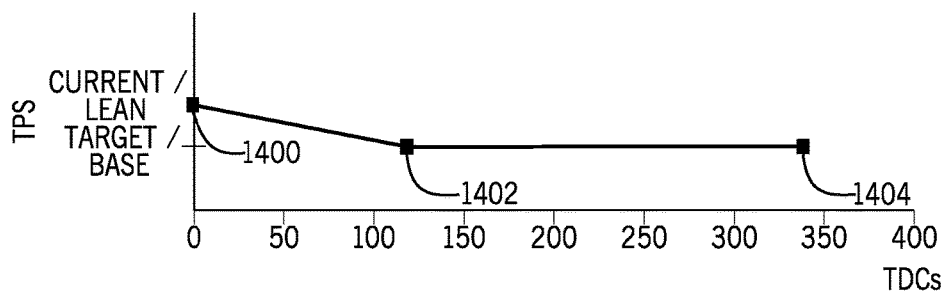
FIG. 14 illustrates a transition from an initial air quantity value to a subsequent air quantity value when transitioning from operating an engine according to the first, lower fuel-air equivalence ratio to operating the engine according to the second, higher fuel-air equivalence ratio.
Figure 15:
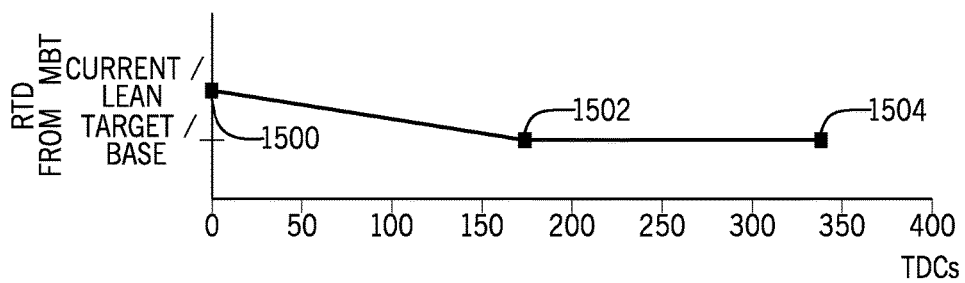
FIG. 15 illustrates a transition from an initial spark plug activation timing value to a subsequent spark plug activation timing value when transitioning from operating an engine according to the first, lower fuel-air equivalence ratio to operating the engine according to the second, higher fuel-air equivalence ratio.

FIGS. 13-15 show graphical depictions of the transition out of lean burn, when the first fuel-air equivalence ratio is less than the second fuel-air equivalence ratio. Therefore, note that what is defined as a "current" value is now the lean value, and what is defined as a "target" value is now a base/stoichiometric value. FIG. 13 shows the FPC value increasing from a current, lean value at 1300 (determined from map 604) to a target, base value at 1306 (determined from map 600). Starting at the same time, air quantity begins to decrease from a current, lean value at 1400 (determined from map 504) to a target, base value at 1402 (determined from map 500). Spark timing also begins to change, from a current, lean value at 1500 (determined from map 404) to a target, base value at 1502 (determined from map 400). At about 120 TDCs, the actual or desired phi value reaches a first predetermined value. This may be the same as the second predetermined phi value corresponding to location 1004 in FIG. 10, or slightly different, depending on calibration. At the same time this first predetermined phi value is reached at 1302, the air quantity reaches its target, base value at 1402. Thus, the method includes completing step (b) in response to the actual or desired fuel-air equivalence ratio $\phi$ reaching a first predetermined value. Thereafter, the method includes holding the target value of the air quantity (i.e., air quantity is held from 1402 to 1404) in response to the actual or desired fuel-air equivalence ratio reaching the first predetermined value. Similarly, the method includes completing step (d) in response to the actual or desired fuel-air equivalence ratio $\phi$ reaching a second, greater predetermined value. For example, as shown at location 1304 at about 175 TDCs, the actual or desired phi value is equal to the second predetermined value, and the spark timing completes its transition to the target, base value at 1502. Thereafter, the method includes holding the target value of the spark plug activation timing (i.e., the spark plug activation timing is held from 1502 to 1504) in response to the actual or desired fuel-air equivalence ratio reaching the second predetermined value. The second predetermined phi value may be the same as at 1002 in FIG. 10 and in that instance corresponds to the location 900 in FIG. 9 where there is a discontinuity in torque gradient while changing fueling amounts. In another example, the second predetermined phi value when transitioning out of lean burn is slightly different than the one used to transition into lean burn, depending on calibration.

Note that the time it takes to transition into lean burn may be different from the time it takes to transition out of lean burn (about 1650 TDCs versus about 340 TDCs) depending on calibration. Note also that when transitioning into lean burn, as shown in FIGS. 10-12, steps (a) transitioning fuel quantity, (b) transitioning air quantity, and (c) transitioning spark activation timing do not all start at the same time. Rather, fuel quantity is transitioned right away and has the most effect on torque change until the phi-torque relationship reaches the point of discontinuity (see 900, FIG. 9), after which throttle and then spark are transitioned to offset what would otherwise be a decrease in torque (see 904, FIG. 9). Air quantity transition is started before spark transition to allow the intake manifold (e.g., air intake conduit 36, FIG. 1) to fill with air. Spark transition is started last because it has the most instantaneous affect on torque. However, the ECM 48 schedules all three of steps (a), (b), and (c) such that they complete simultaneously at 1006, 1104, and 1204 respectively, at about 1650 TDCs. This represents the end of the transition period, after which the engine 10 is operated according to values determined from the lean burn maps 404, 504, 604 in response to a change in RPM and/or demand. In contrast, FIGS. 13-15 show that the ECM 48 schedules transitions from lean burn to stoichiometric operation such that each of steps (a), (b), and (c) commence simultaneously, here, at zero TDCs. This way, air and spark changes can be ramped out before fuel changes have completed, and the phi changes due to fueling changes from 1304 to 1306 will be in the relatively linear region 902 of the graph of FIG. 9. Such cadencing, both when transitioning into and out of lean burn, virtually eliminates any change in torque that can be felt by the passengers on the vessel.

Using separate calibratable phi-trigger values for starting spark and throttle transitions means that any changes to the base fueling map 600 will not affect the lean burn transitions. Because spark and throttle ramps are scheduled from fixed phi values when transitioning into lean burn, no matter what changes are made to base fueling map 600, the spark and throttle ramps will always be cadenced such that they follow the steepest part 900 of the phi-torque gradient (FIG. 9). Scheduling spark and throttle transitions to end at calibrated phi values when transitioning out of lean burn also allows for neutralizing the steep torque gradient caused by the fueling change. No lean burn calibration changes are required if the base fueling map 600 changes.

During lean burn algorithm development, the present inventors also noted that the base fueling error could be different between lean burn and stoichiometric engine operation at the same speed/load conditions. This is not as big of a concern during stoichiometric operation, because torque is not influenced as much by fueling error when in stoichiometric operation as it is when the engine 10 is in lean burn. While in lean burn, as noted with respect to FIG. 9, the torque gradient becomes quite steep with respect to phi changes due to fueling changes, as shown at phi values below the area shown at 900. The present inventors therefore developed a method for adapting fueling maps separately when in stoichiometric operation than when in lean burn, which allows for smooth transitions when entering and exiting lean burn.

Figure 7A:
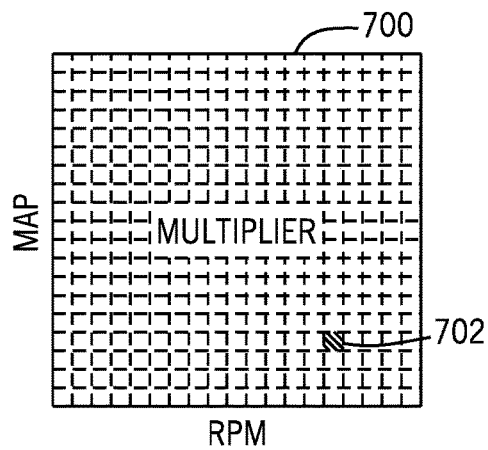
FIGS. 7A and 7B illustrate a specific example of an input-output map for determining an engine control parameter multiplier or adder.

Typically, a fueling adaptation strategy will measure fueling error by way of an oxygen sensor 71 and will populate an adapt map having cells defined by a combination of speed and load. For example, FIG. 7A shows a base adapt map 700 containing multipliers in the form of percentages (or containing adders) that are multiplied (added) with values determined from the fueling map 600 in FIG. 6A to determine an adjusted fuel quantity to be provided to the combustion chamber 28. The multipliers/adders are known as "fuel trim" and are determined using feedback control, which minimizes a difference between a target and an actual fuel-air equivalence ratio. For example, say the engine 10 is has a particular RPM and demand that correspond to the value in location 602 being used as the commanded fuel per cylinder. This quantity of fuel is provided, and the combustion process takes place. The oxygen sensor 71 reports an oxygen or lambda value to the ECM 48, which calculates an actual fuel-air equivalence ratio $\phi$ from the reported value and compares it to, in this example, a target fuel-air equivalence ratio of 1 using a feedback controller, shown schematically at 88 in FIG. 2. If the feedback controller 88 determines there is an error between the actual and the target fuel-air equivalence ratios, the feedback controller 88 will output a value by which fueling is to be increased or decreased in order to achieve the target value. This correction factor is also saved in an adapt map (700 in FIG. 7A). The next time the engine 10 has the same RPM and demand, the ECM 48 will not merely send through the value determined from location 602 for fueling, but will instead multiply/add this value by/to the adapt multiplier/adder from the corresponding location 702 in map 700. If this adapted/adjusted value results in error as well, the feedback controller 88 will determine a new fuel trim multiplier/adder that achieves the target fuel-air equivalence ratio and will update location 702 in the adapt map 700. This way, the fueling quantities are adapted continuously so that factors such as leaks, low pressure, old parts, etc. can be compensated for over time throughout the engine's life.

Figure 7B:
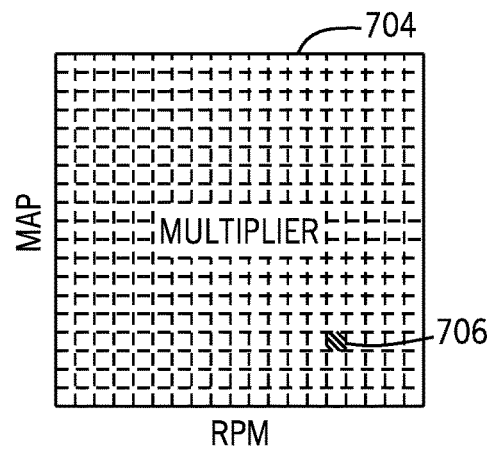
Figure 21:
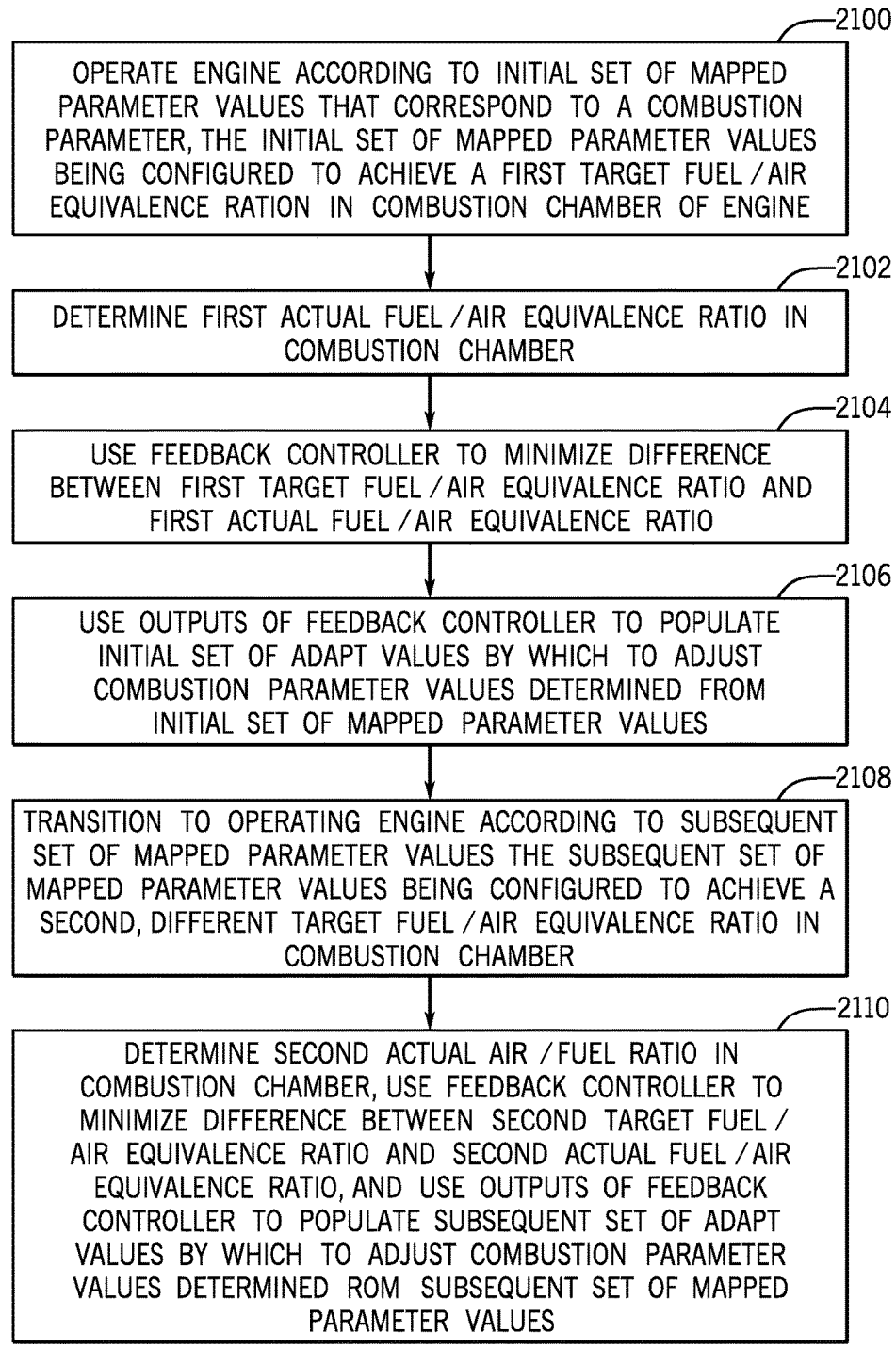

However, because of the above-noted greater affects of fueling errors on lean burn than on stoichiometric operation, using the same adapt map 700 while in lean burn is not as effective as is using a separate, lean-burn-specific adapt map. Such a map is shown at 704 in FIG. 7B. FIG. 21 shows a method according to the present disclosure, which allows for populating a separate lean burn adapt map 704, which is only populated when lean burn is active. Correspondingly, the stoichiometric adapt map 700 is only populated when lean burn is disabled. As shown at 2100, the method includes operating the engine 10 according to an initial set of mapped parameter values from map 600 that correspond to a combustion parameter (e.g., fuel quantity), the initial set of mapped parameter values in map 600 being configured to achieve a first target fuel-air equivalence ratio in a combustion chamber 28 of the engine 10. As shown at 2102, the method includes determining a first actual fuel-air equivalence ratio in the combustion chamber 28, such as by using oxygen sensor 71 placed along the engine's exhaust path. As shown at 2104, the method includes using a feedback controller 88 to minimize a difference between the first target fuel-air equivalence ratio and the first actual fuel-air equivalence ratio. The method also includes using outputs of the feedback controller 88 to populate an initial set of adapt values in map 700 (here, fuel trim values) by which to adjust combustion parameter values determined from the initial set of mapped parameter values of map 600, as shown at 2106.

Next, as shown at 2108, the method includes transitioning to operating the engine 10 according to a subsequent set of mapped parameter values in map 604 (here, fuel quantity values), the subsequent set of mapped parameter values in map 604 being configured to achieve a second, different target fuel-air equivalence ratio in the combustion chamber 28. After the step of transitioning, as shown at 2110, the method includes determining a second actual fuel-air equivalence ratio in the combustion chamber 28, using the feedback controller 88 to minimize a difference between the second target fuel-air equivalence ratio and the second actual fuel-air equivalence ratio, and using the outputs of the feedback controller 88 to populate a subsequent set of adapt values stored in map 704 (here, fuel trim values) by which to adjust the combustion parameter values determined from the subsequent set of mapped parameter values in map 604.

According to the present disclosure, the initial set of adapt values in map 700 is unique from the subsequent set of adapt values in map 704, and the ECM 48 populates only one of the initial set of adapt values (map 700) and the subsequent set of adapt values (map 704) at a time. This way, the adapt values are specific to stoichiometric or to lean burn operation. In order to determine when to start or stop populating a given adapt map 700, 704, the ECM 48 may measure current values of engine operating conditions and begin the step of transitioning in response to the engine operating conditions meeting predetermined criteria. These may be the same lean-burn enablement criteria noted herein above with respect to FIGS. 16 and 17. The ECM 48 will cease populating the initial set of adapt values in map 700 in response to beginning the step of transitioning. The ECM 48 will begin populating the subsequent set of adapt values in map 704 in response to completing the step of transitioning. Note that although transitions have heretofore been described as being from stoichiometric to lean burn, transitions in the opposite direction are also provided for in the same manner.

During the transition into or out of lean burn, the method includes transitioning from operating the engine 10 according to an initial value of the combustion parameter (e.g., the value at location 602) determined from the initial set of mapped parameter values (e.g., map 600) to operating the engine 10 according to a subsequent value of the combustion parameter (e.g., the value at location 606) determined from the subsequent set of mapped parameter values (e.g., map 604). This is done according to the lean burn transition method described herein above with respect to FIG. 10 or FIG. 13. The present method also includes ramping from an initial adapt value (e.g., the value at location 702) determined from the initial set of adapt values (e.g., map 700) to a subsequent adapt value (e.g., the value at location 706) determined from the subsequent set of adapt values (e.g., map 704). For example, if the engine is operating at stoichiometric and the fuel adapt from map 700 is 3%, but then the transition state is enabled, the ECM 48 will disable the feedback controller 88 and will determine from map 704 what the corresponding lean burn adapt value is. If this value is −1%, for example, the ECM 48 will blend the fuel trim from +3% to −1% over the course of the transition. Note that as above, the values that start and end the fueling ramps and fuel trim ramps are determined from corresponding cells of the maps 600, 604, 700, 704. In other words, the ECM 48 determines both the initial adapt value and the subsequent adapt value based on a speed of the engine and a demand on the engine using the adapt maps 700, 704.

When the initial and subsequent sets of mapped parameter values contain nominal mapped parameter values, such as shown herein with respect to FIGS. 6A and 6B, the method further comprises determining a nominal combustion parameter value from one of the initial and subsequent sets of mapped parameter values and determining an adapt value from a corresponding one of the initial and subsequent sets of adapt values found in maps 700, 704. The ECM 48 then multiplies/adds the nominal combustion parameter value from location 602 or location 606 by/to the adapt value at location 702 or location 706 to determine an adapted combustion parameter value according to which the engine 10 is operated. Note that in other examples, the ECM 48 does not store separate adapt maps containing multipliers or adders; instead, the outputs of the feedback controller 88 can be used to update the values in the fuel quantity maps 600, 604 themselves. In this latter example, the method includes adjusting the combustion parameter values in the initial and subsequent sets of mapped parameter values in maps 600, 604 by the initial and subsequent sets of adapt values, respectively, and overwriting the initial and subsequent sets of mapped parameter values in maps 600, 604 with the respective adjusted combustion parameter values.

Because the feedback controller 88 is turned off before the transition into or out of lean burn and then turned back on after the transition in either direction is complete, it may be desirable to limit the effect the output and/or gain of the feedback controller 88 has on the fuel quantity upon re-starting of feedback control. For this reason, the ECM 48 filters in at least one of the output and the gain of the feedback controller 88 to minimize the difference between the target fuel-air equivalence ratio and the actual fuel-air equivalence ratio in response to completing the step of transitioning into or out of lean burn. For example, the ECM 48 may filter in the integral term and/or the integral gain of the feedback controller 88. This prevents abrupt changes in the fueling output which would otherwise create undesired torque change.

Utilizing separate stoichiometric and lean burn adapt maps (or separate adaptation of separate stoichiometric and lean burn maps) allows for tighter control over fueling between states and reduces any torque difference during transitions that might otherwise be influenced by fueling error.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for controlling a marine internal combustion engine, the method being carried out by a control module and comprising:
   operating the engine according to an initial set of mapped parameter values that correspond to a combustion parameter, the initial set of mapped parameter values being configured to achieve a first target fuel-air equivalence ratio in a combustion chamber of the engine;
   determining a first actual fuel-air equivalence ratio in the combustion chamber;
   using a feedback controller to minimize a difference between the first target fuel-air equivalence ratio and the first actual fuel-air equivalence ratio;
   using outputs of the feedback controller to populate an initial set of adapt values by which to adjust combustion parameter values determined from the initial set of mapped parameter values;
   transitioning to operating the engine according to a subsequent set of mapped parameter values that correspond to the combustion parameter, the subsequent set of mapped parameter values being configured to achieve a second, different target fuel-air equivalence ratio in the combustion chamber; and
   after the step of transitioning, determining a second actual fuel-air equivalence ratio in the combustion chamber, using the feedback controller to minimize a difference between the second target fuel-air equivalence ratio and the second actual fuel-air equivalence ratio, and using the outputs of the feedback controller to populate a subsequent set of adapt values by which to adjust combustion parameter values determined from the subsequent set of mapped parameter values.

2. The method of claim 1, wherein the initial set of adapt values is unique from the subsequent set of adapt values, and further comprising populating only one of the initial set of adapt values and the subsequent set of adapt values at a time.

3. The method of claim 2, further comprising:
   measuring current values of engine operating conditions;
   beginning the step of transitioning in response to the engine operating conditions meeting predetermined criteria; and
   ceasing populating the initial set of adapt values in response to beginning the step of transitioning.

4. The method of claim 3, further comprising beginning populating the subsequent set of adapt values in response to completing the step of transitioning.

5. The method of claim 4, further comprising filtering in at least one of an output and a gain of the feedback controller to minimize the difference between the second target fuel-air equivalence ratio and the second actual fuel-air equivalence ratio in response to completing the step of transitioning.

6. The method of claim 3, wherein the step of transitioning further comprises:
   transitioning from operating the engine according to an initial value of the combustion parameter determined from the initial set of mapped parameter values to operating the engine according to a subsequent value of the combustion parameter determined from the subsequent set of mapped parameter values; and
   ramping from an initial adapt value determined from the initial set of adapt values to a subsequent adapt value determined from the subsequent set of adapt values.

7. The method of claim 6, further comprising determining both the initial adapt value and the subsequent adapt value based on a speed of the engine and a torque demand on the engine.

8. The method of claim 3, wherein the initial and subsequent sets of mapped parameter values contain nominal mapped parameter values, and the method further comprises:
   determining a nominal combustion parameter value from one of the initial and subsequent sets of mapped parameter values;
   determining an adapt value from a corresponding one of the initial and subsequent sets of adapt values; and
   multiplying the nominal combustion parameter value by the adapt value to determine an adapted combustion parameter value according to which the engine is operated.

9. The method of claim 3, further comprising adjusting the combustion parameter values from the initial and subsequent sets of mapped parameter values by the initial and subsequent sets of adapt values, respectively, and overwriting the initial and subsequent sets of mapped parameter values with the respective adjusted combustion parameter values.

10. The method of claim 1, wherein the combustion parameter is a quantity of fuel to be supplied to the combustion chamber.

11. The method of claim 1, wherein one of the first and second target fuel-air equivalence ratios is greater than or equal to 1 and the other of the first and second target fuel-air equivalence ratios is less than 1.

12. A method for controlling a marine internal combustion engine, the method being carried out by a control module and comprising:
   operating the engine according to an initial set of mapped fuel quantity values, the initial set of mapped fuel quantity values being configured to achieve a first target fuel-air equivalence ratio in a combustion chamber of the engine;
   determining a first actual fuel-air equivalence ratio in the combustion chamber;
   using a feedback controller to minimize a difference between the first target fuel-air equivalence ratio and the first actual fuel-air equivalence ratio;
   using outputs of the feedback controller to populate an initial set of fuel trim values by which to adjust fuel quantity values determined from the initial set of mapped fuel quantity values;
   transitioning to operating the engine according to a subsequent set of mapped fuel quantity values, the subsequent set of mapped fuel quantity values being configured to achieve a second, different target fuel-air equivalence ratio in the combustion chamber; and
   after the step of transitioning, determining a second actual fuel-air equivalence ratio in the combustion chamber, using the feedback controller to minimize a difference between the second target fuel-air equivalence ratio and the second actual fuel-air equivalence ratio, and using the outputs of the feedback controller to populate a subsequent set of fuel trim values by which to adjust fuel quantity values determined from the subsequent set of mapped fuel quantity values.

13. The method of claim 12, wherein the initial set of fuel trim values is unique from the subsequent set of fuel trim values, and further comprising populating only one of the initial set of fuel trim values and the subsequent set of fuel trim values at a time.

14. The method of claim 13, further comprising:
measuring current values of engine operating conditions;
beginning the step of transitioning in response to the engine operating conditions meeting predetermined criteria; and
ceasing populating the initial set of fuel trim values in response to beginning the step of transitioning.

15. The method of claim 14, further comprising beginning populating the subsequent set of fuel trim values in response to completing the step of transitioning.

16. The method of claim 15, further comprising filtering in at least one of an output and a gain of the feedback controller to minimize the difference between the second target fuel-air equivalence ratio and the second actual fuel-air equivalence ratio in response to completing the step of transitioning.

17. The method of claim 14, wherein the step of transitioning further comprises:
transitioning from operating the engine according to an initial fuel quantity value determined from the initial set of mapped fuel quantity values to operating the engine according to a subsequent fuel quantity value determined from the subsequent set of mapped fuel quantity values; and
ramping from an initial fuel trim value determined from the initial set of fuel trim values to a subsequent fuel trim value determined from the subsequent set of fuel trim values.

18. The method of claim 17, further comprising determining both the initial fuel trim value and the subsequent fuel trim value based on a speed of the engine and a torque demand on the engine.

19. The method of claim 14, wherein the initial and subsequent sets of mapped fuel quantity values contain nominal mapped fuel quantity values, and the method further comprises:
determining a nominal fuel quantity value from one of the initial and subsequent sets of mapped fuel quantity values;
determining a fuel trim value from a corresponding one of the initial and subsequent sets of fuel trim values; and
multiplying the nominal fuel quantity value by the fuel trim value to determine an adapted fuel quantity value according to which the engine is operated.

20. The method of claim 12, wherein one of the first and second target fuel-air equivalence ratios is greater than or equal to 1 and the other of the first and second target fuel-air equivalence ratios is less than 1.

* * * * *